MAGNETIC RECORDING AND REPRODUCING APPARATUS

Filed Aug. 22, 1944 12 Sheets-Sheet 1

INVENTORS
J. P. Arndt, Jr. C. B. Jones
and S. J. Begun
BY
Pieles & Greene
ATTORNEYS INVENTORS
J. P. Arndt, Jr., C. B. Jones
and S. J. Begun
BY
Pinelle & Greene
ATTORNEYS Dec. 26, 1950 J. P. ARNDT, JR., ET AL 2,535,478

MAGNETIC RECORDING AND REPRODUCING APPARATUS

Filed Aug. 22, 1944 12 Sheets-Sheet 3

INVENTORS
J. P. Arndt, Jr., C. B. Jones
and S. J. Begun
BY Pinelles & Greene
ATTORNEYS INVENTORS
J. P. ARNDT, JR.
C. B. JONES
S. J. BEGUN
BY Pineles & Greene
ATTORNEYS

MAGNETIC RECORDING AND REPRODUCING APPARATUS

Filed Aug. 22, 1944 12 Sheets-Sheet 5

INVENTORS
J. P. ARNDT, JR.
C. B. JONES
S. J. BEGUN

BY Pirelles & Greene

ATTORNEYS

MAGNETIC RECORDING AND REPRODUCING APPARATUS

INVENTORS
J. P. ARNDT, JR.
C. B. JONES, S. J. BEGUN
BY Pinilla & Greene
ATTORNEYS Dec. 26, 1950 J. P. ARNDT, JR., ET AL 2,535,478

MAGNETIC RECORDING AND REPRODUCING APPARATUS

Filed Aug. 22, 1944 12 Sheets-Sheet 7

INVENTORS
J. P. ARNDT, JR.
C. B. JONES
S. J. BEGUN

BY Pinelles & Greene
ATTORNEYS

Dec. 26, 1950 J. P. ARNDT, JR., ET AL 2,535,478

MAGNETIC RECORDING AND REPRODUCING APPARATUS

Filed Aug. 22, 1944 12 Sheets-Sheet 8

INVENTORS
J. P. ARNDT, JR.
C. B. JONES
S. J. BEGUN

BY Pineles & Greene

ATTORNEYS

Dec. 26, 1950 J. P. ARNDT, JR., ET AL 2,535,478

MAGNETIC RECORDING AND REPRODUCING APPARATUS

Filed Aug. 22, 1944 12 Sheets-Sheet 9

INVENTORS
J. P. ARNDT, JR.
C. B. JONES
S. J. BEGUN

BY Pirelle & Greene

ATTORNEYS

Dec. 26, 1950 J. P. ARNDT, JR., ET AL 2,535,478

MAGNETIC RECORDING AND REPRODUCING APPARATUS

Filed Aug. 22, 1944 12 Sheets-Sheet 10

INVENTORS
J. P. ARNDT, JR.
C. B. JONES
S. J. BEGUN

BY Pinelles & Greene

ATTORNEYS

Dec. 26, 1950 J. P. ARNDT, JR., ET AL 2,535,478

MAGNETIC RECORDING AND REPRODUCING APPARATUS

Filed Aug. 22, 1944 12 Sheets-Sheet 11

INVENTORS
J. P. ARNDT, JR.
C. B. JONES
S. J. BEGUN

BY Pinèles & Greene

ATTORNEYS

INVENTORS
J. P. ARNDT, JR.
C. P. JONES
S. J. BEGUN
BY Pinelas + Greene
ATTORNEYS Patented Dec. 26, 1950 2,535,478

UNITED STATES PATENT OFFICE 2,535,478

MAGNETIC RECORDING AND REPRODUCING APPARATUS

John P. Arndt, Jr., Euclid, and Cary B. Jones and Semi Joseph Begun, Cleveland Heights, Ohio, assignors to The Brush Development Company, Cleveland, Ohio, a corporation of Ohio Application August 22, 1944, Serial No. 550,571

26 Claims. (Cl. 179—100.2)

This invention relates to magnetic recording and reproducing apparatus, and more particularly to apparatus utilizing a spirally-wound magnetic record track, such as a tape or wire, for recording and reproducing signals.

Among the objects of the invention are novel magnetic recording and reproducing devices of the foregoing type which overcome critical difficulties heretofore encountered with such devices and which render their operation more foolproof and reliable.

The foregoing and other objects of the invention will be best understood from the following description of exemplifications thereof, reference being had to the accompanying drawings wherein.

Figures 5, 6:
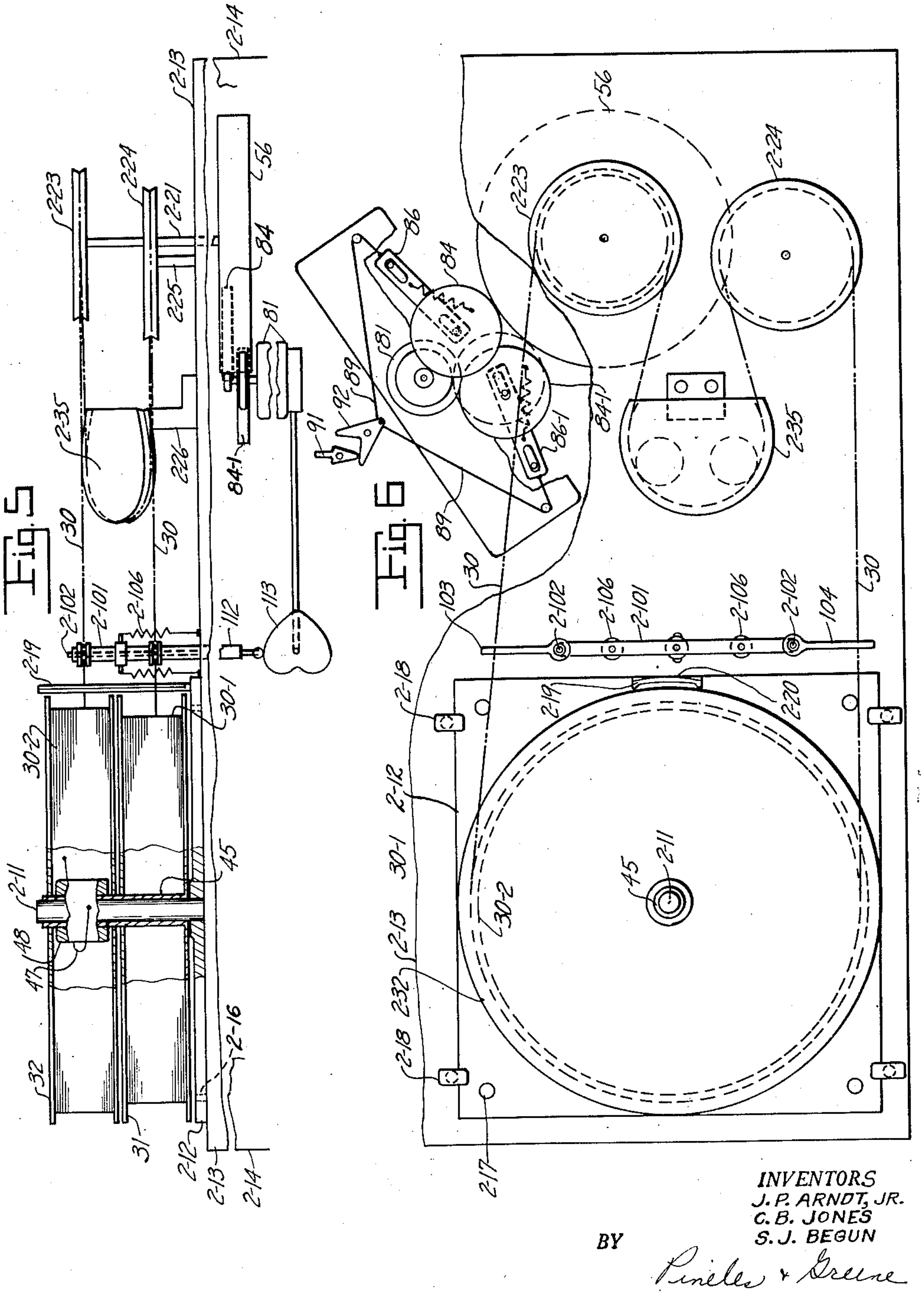
Figs 5 and 6 are views similar to Figs. 1 and 2 of another magnetic recording and reproducing device exemplifying the invention.
Figure 7:
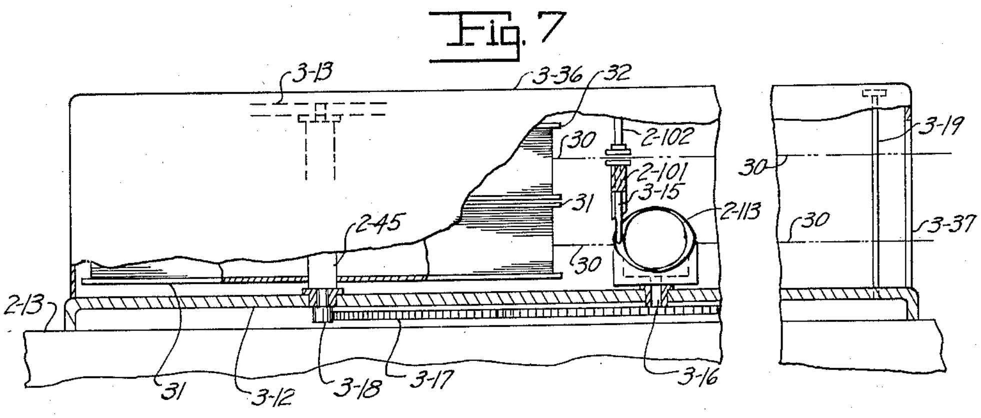
Figures 8, 9:
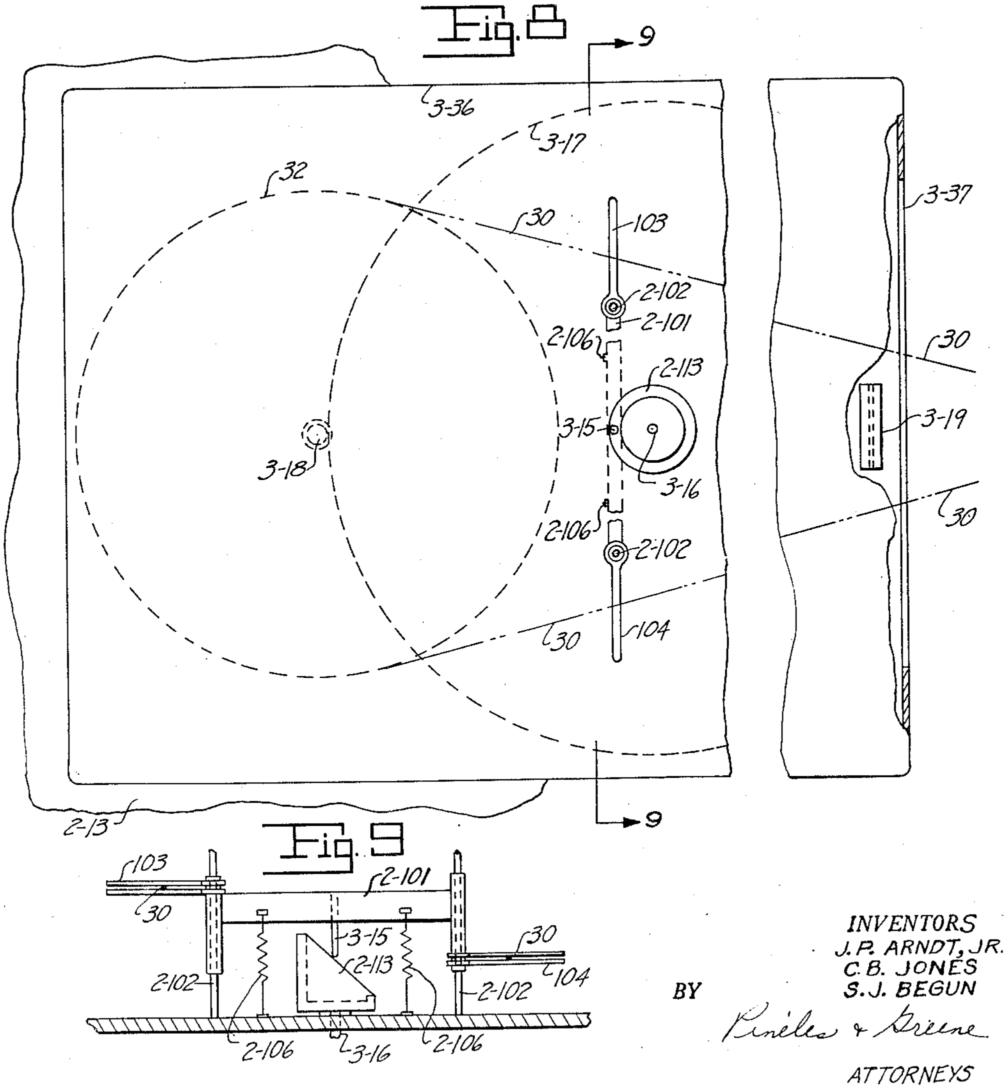
Figure 10:
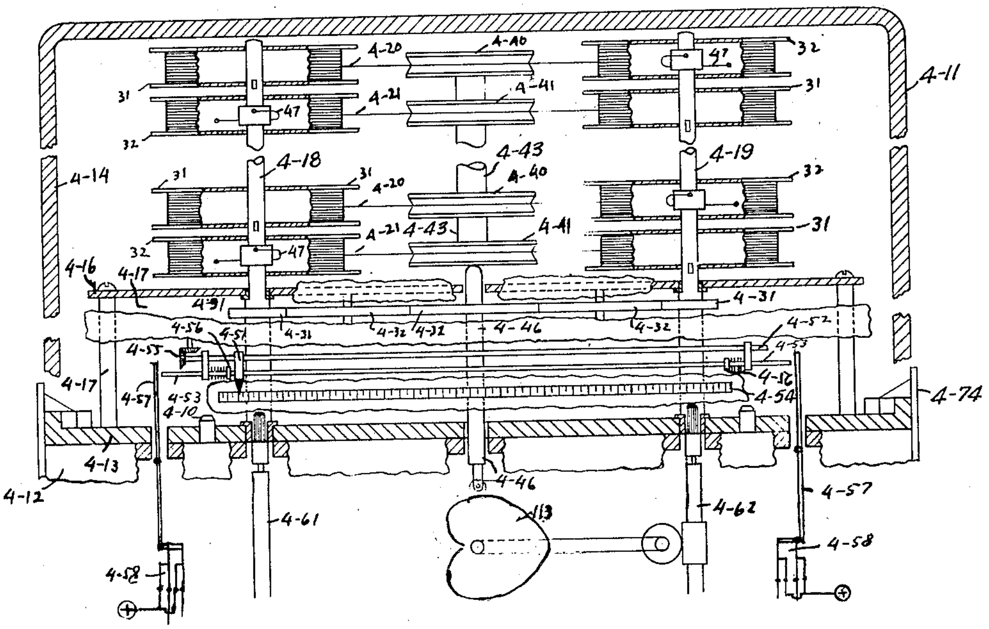
Figure 11:
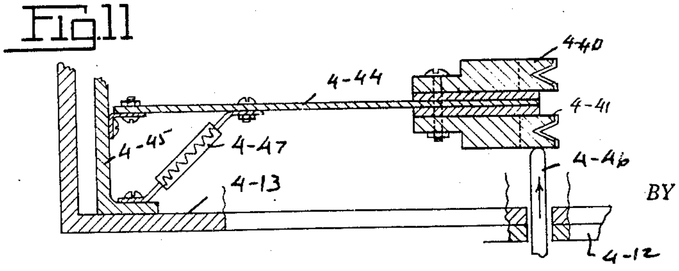
Figure 12:
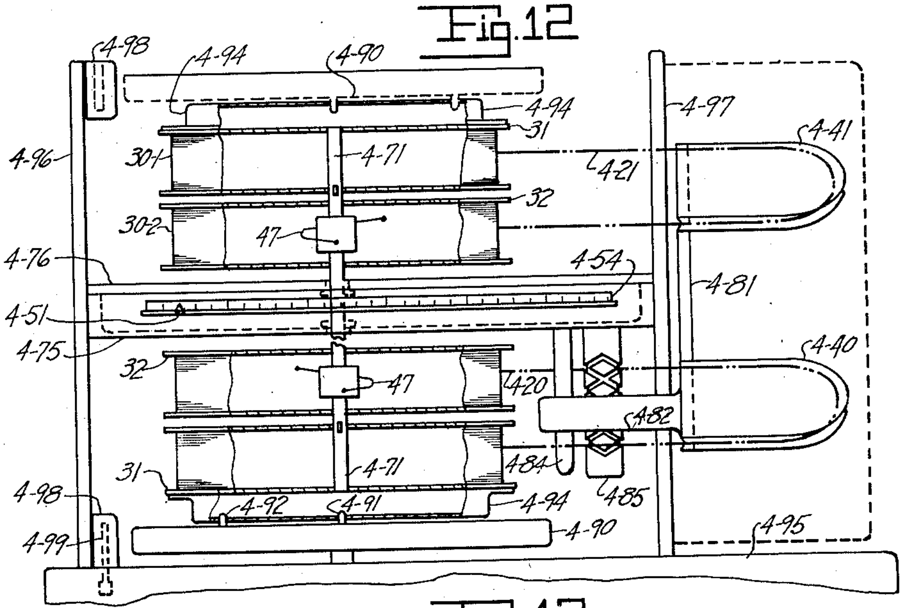
Figure 13:
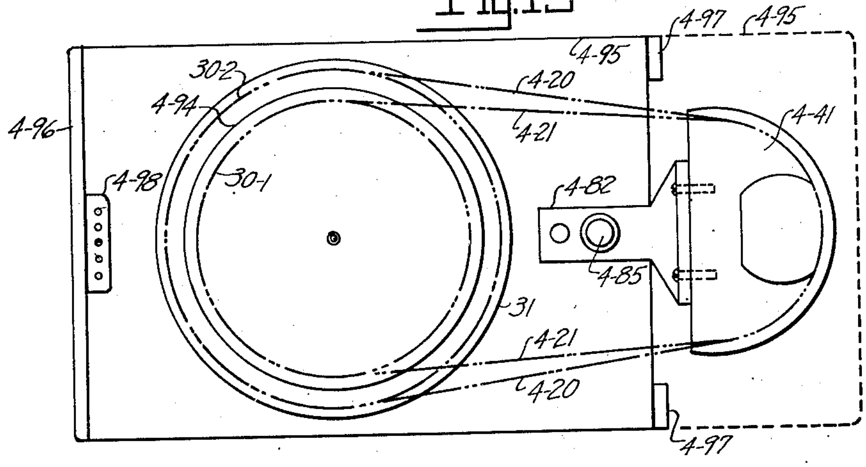
Figures 14, 15, 16, 17, 18:
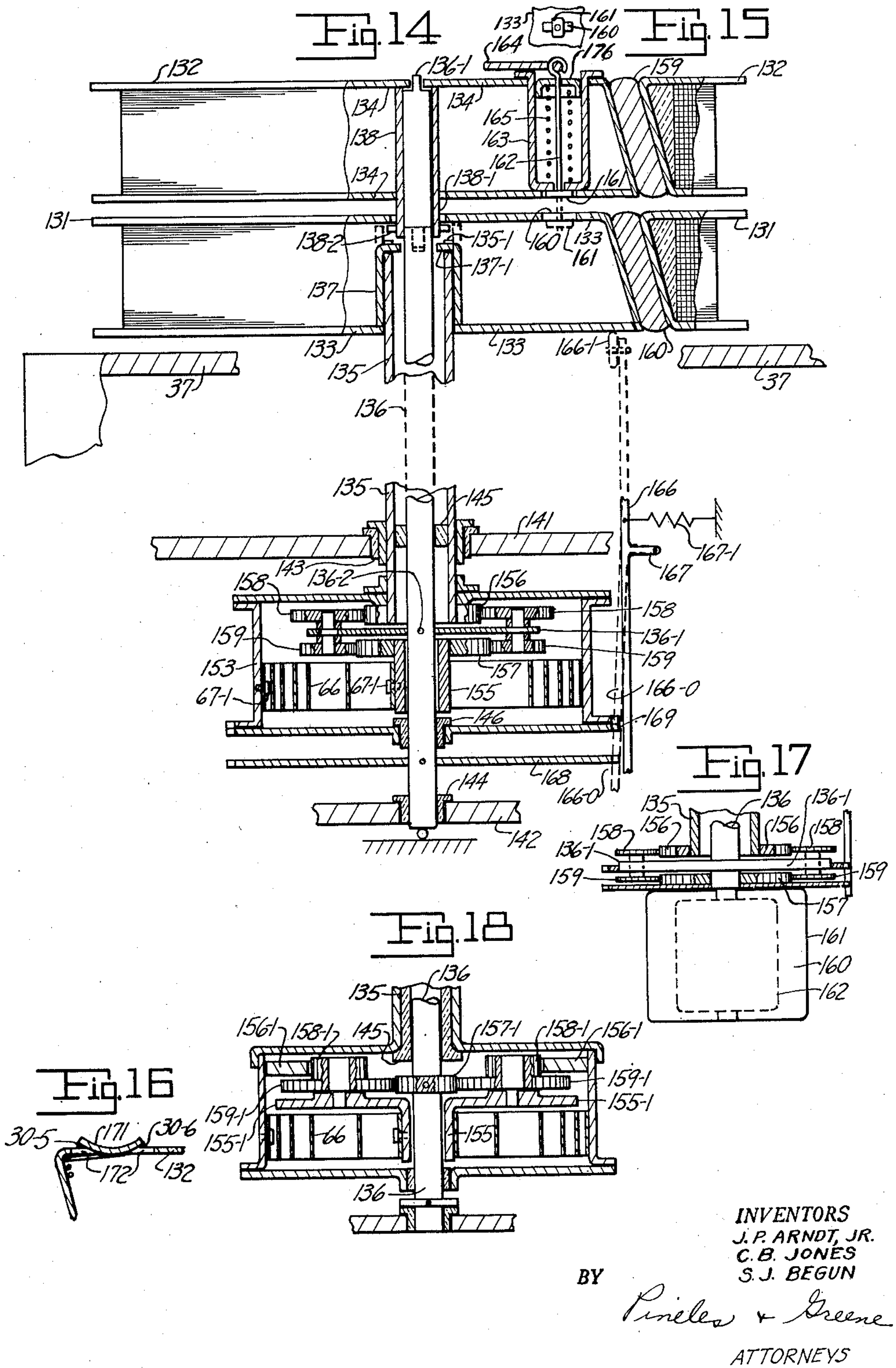
Figure 19:
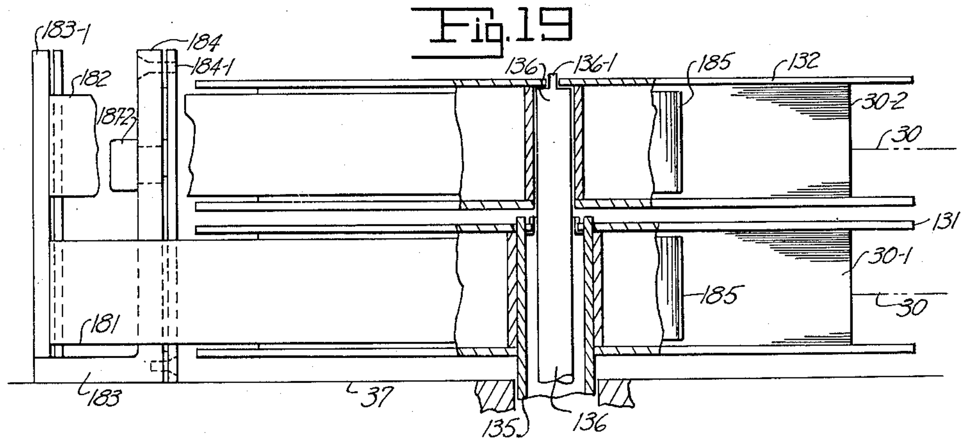
Figures 20, 21, 22:
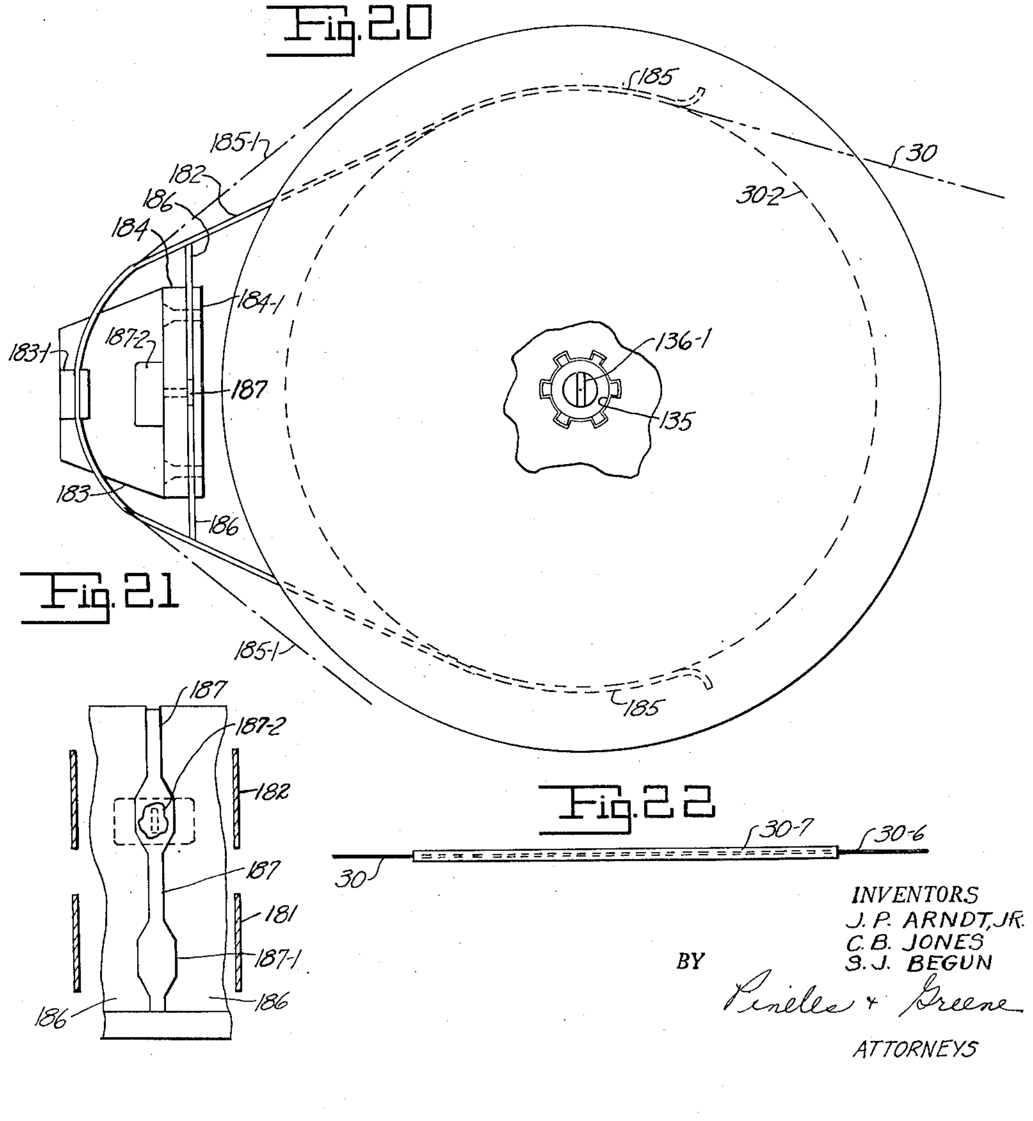
Figure 23:
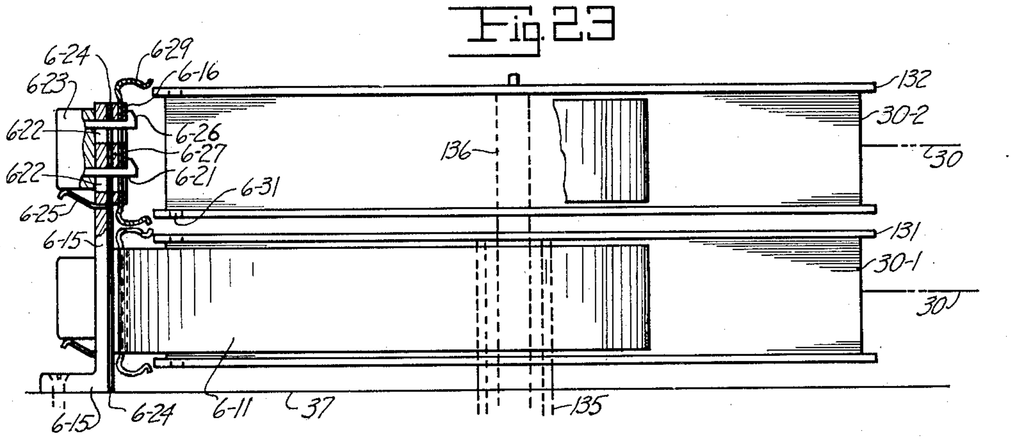
Figure 24:
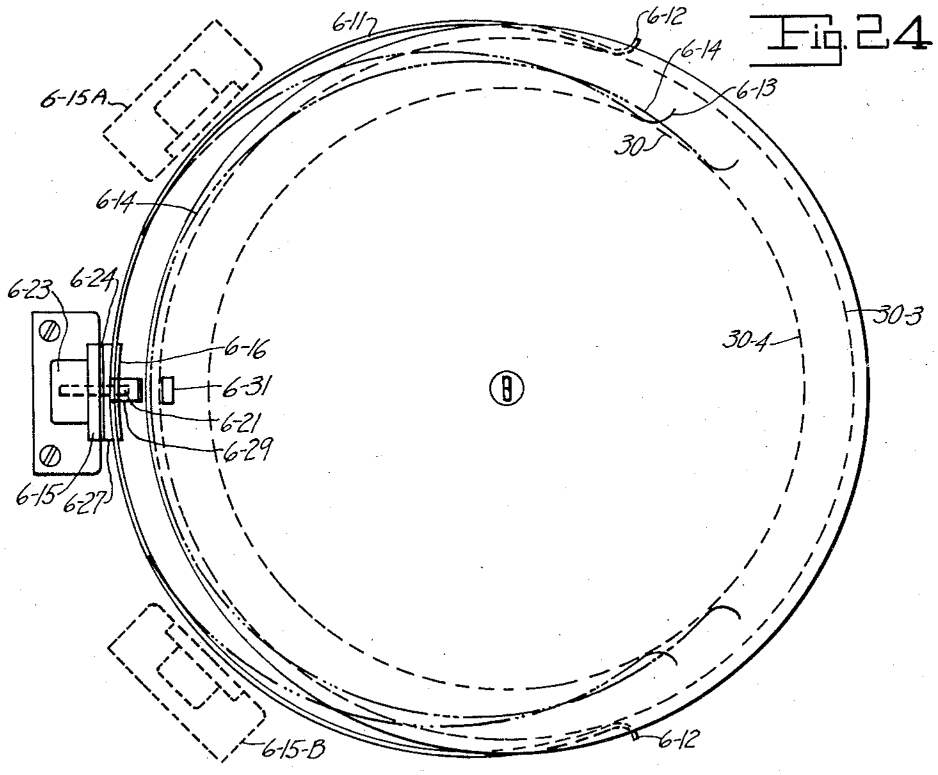
Figure 25:
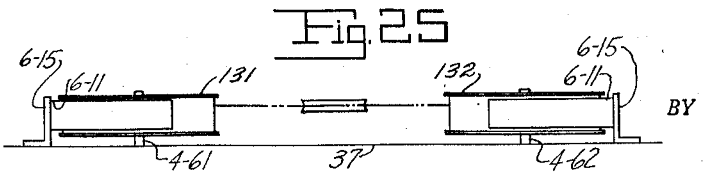
Figure 26:
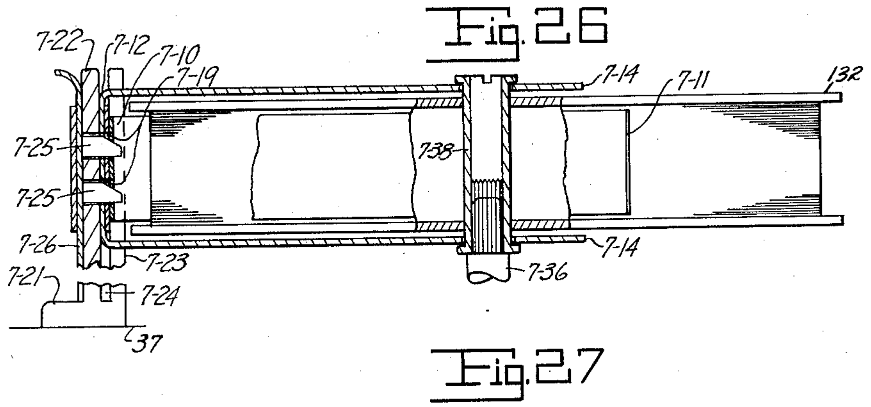
Figure 27:
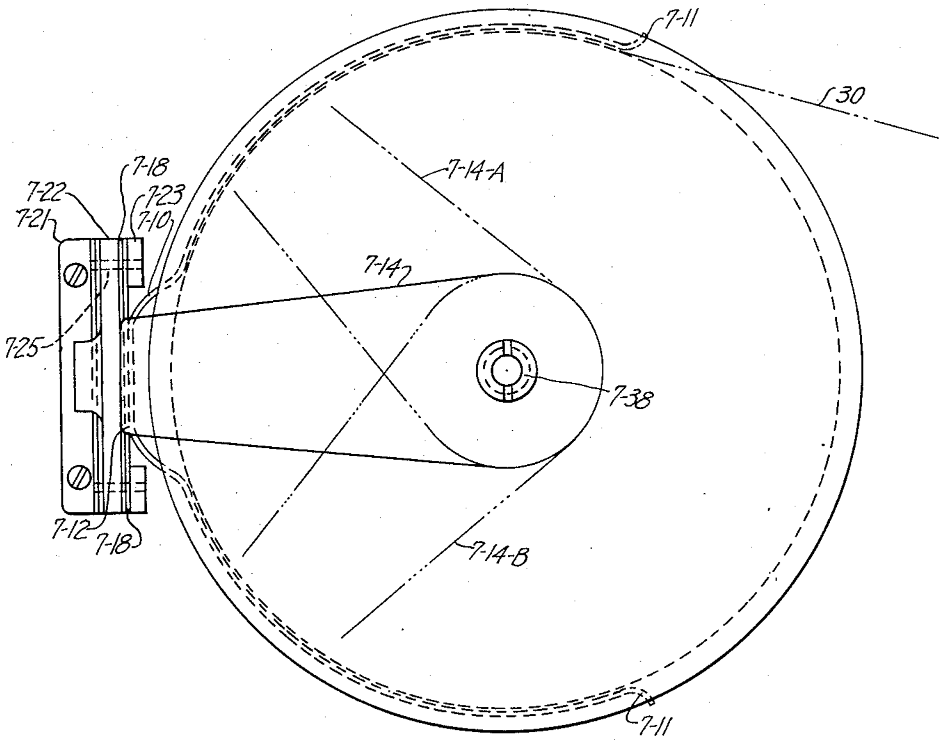
Figure 28:
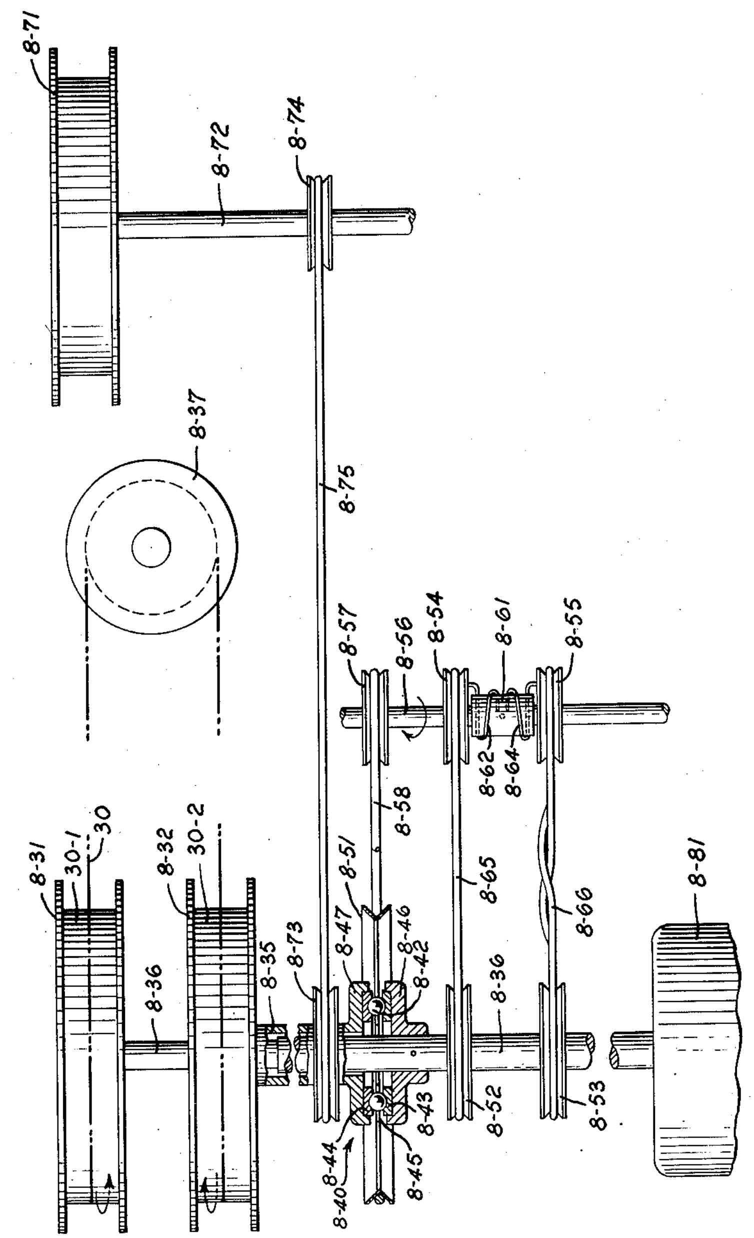

Figs. 7 and 8 are views similar to Figs. 5 and 6 illustrating a modified form of reel arrangement for a device of the type shown in Figs. 5 and 6;

Fig. 9 is a side view of some of the elements shown in Figs. 7 and 8, along line 9—9 of Fig. 8;

Fig. 10 is a diagrammatic, elevational, partially exploded view illustrating the general cooperative relationship of the principal elements of another form of magnetic recording-reproducing device exemplifying the invention;

Fig. 11 is a transverse cross-sectional view along the central region of Fig. 10;

Figs. 12 and 13 are views similar to Figs. 5 and 6 of a further form of magnetic recording-reproducing device exemplifying the invention;

Fig. 14 is a view similar to Fig. 5 of another type of reel arrangement exemplifying the principles of the invention;

Fig. 15 is a detailed plan view of an upwardly facing portion of the lower reel unit of Fig. 14;

Fig. 16 is a detailed cross-sectional view similar to Fig. 14 of a portion of the reel structure;

Figs. 17 and 18 are views similar to Fig. 14 of further forms of reel mechanisms of the invention;

Figs. 19 and 20 are views similar to Figs. 5 and 6 showing modified forms of reel arrangements exemplifying the invention;

Fig. 21 is an elevational view of a part of the reel arrangement shown in Fig. 19;

Fig. 22 is an elevational view of an end portion of a record track filament used with the reel arrangement shown;

Figs. 23 and 24 are views similar to Figs. 19 and 20 of another form of reeling arrangement of the invention;

Fig. 25 is a view of an apparatus similar to Fig. 10 equipped with a reel arrangement of the type shown in Fig. 23;

Figs. 26 and 27 are views similar to Figs. 19 and 20 of a further form of reel arrangement; and Fig. 28 is a view similar to Fig. 14 showing another form of reel arrangement based on the principles of the invention.

Although many features of the present invention are applicable to recording on magnetic tape, the magnetic recording and reproducing device shown in Figs. 1 to 4 exemplifies the invention as applied to a magnetic record track formed of a long thin magnetic record track filament, such as a wire or wire-like tape which is spirally coiled and stored in the form of coils 30—1, 30—2 on two reels 31, 32 and arranged so that an intermediate cross loop length 30 thereof is guided and impelled from one reel to the other past the pole-piece region 33 of a magnetic transducer head 35. The two reels 31, 32 and the associated elements serving to guide and impel the magnetic record track 30 past the transducer head 35 are mounted and supported in their proper operating condition within a self-supporting detachable guide unit 36 shown in the form of a housing designed for detachable interconnection with a driving or motor unit 37 which supplies the mechanical power required for impelling the magnetic record track 30.

The motor unit 37 may be made in the form of a box-like structure in which the amplifier and the other control elements for controlling the recording and reproducing operations may be housed. The guide unit 36 shown serves as a self-supporting holder structure comprising a rectangular base plate 41 and a mounting bar or plate 42 spaced above it and suitably secured thereto, as by posts, not shown, a casing-like cover 43 overlying the mounting bar or plate 42, being suitably secured to the base plate 41 so as to constitute therewith a casing structure enclosing the various operating elements of the guide unit.

The two reels 31, 32 are shown mounted on a shaft 45, the ends of which may be journalled for revolvable motion in suitable bearings held in the base plate 41 and mounting bar or plate 42, respectively. In the form diagrammatically shown in Fig. 1, reel 31 is affixed to the shaft 45 as by a key and the other reel 32 is revolvably mounted on the shaft and is connected thereto through motion-transmitting means indicated as formed by a spirally-wound spring 47, one end of which is affixed to a collar element 48 secured to the shaft and the other end of which is secured to the rim of the reel so that when either one of the reels 31, 32 is rotated, it will transmit through the shaft 45 and the interconnecting spring 47 a force tending to impart a corresponding motion to the other reel.

Figure 1:
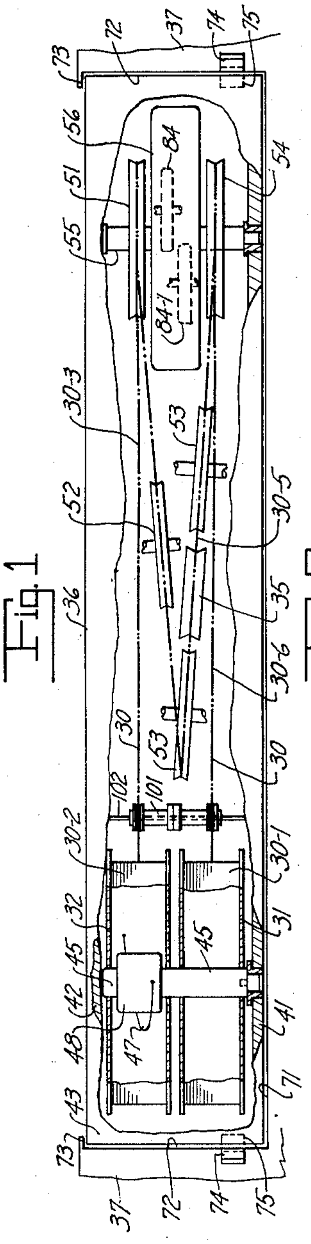
Fig. 1 is a diagrammatic elevational view of a magnetic recording-reproducing device exemplifying the invention with parts of the front wall broken away to show the interior.

The elastically-deformable spring connection 47 indicated diagrammatically in Fig. 1 may be made in the form of a spirally-wound flat spring similar in construction to springs used in clocks or spring drives of motion picture cameras. The spring is preferably made of a non-magnetic material, such as beryllium copper or Phosphor bronze. In general, all parts of the magnetic recording apparatus other than the magnetic record track and certain elements of the transducer head should be made of non-magnetizable material.

The motion transmitting connection between the two reels including the spring 47 is so arranged, and the two coils 30—1, 30—2 are so wound on the two reels, that when a length of the record track forming part of the cross-over loop 30 is withdrawn from one reel, reel 32, for instance, in a clockwise rotation thereof, its reverse motion-transmitting connection through the shaft 45 and spring 47 will transmit a corresponding motion to the other reel 31 for winding thereon a corresponding length of the cross loop 30 and vice versa.

When a new record is made on the record track its cross loop 30 is withdrawn from the upper reel 32 along the cross loop section 30—3 over a guide groove of a guide member 51 toward another cross loop section moving over a guide groove of a guide member 52 and led therefrom toward a cross loop section 30—5 passing over the guide grooves of two guide members 53, which guide it in its proper operative position along the transducer head 35, and therefrom along the cross loop portion guided over the guide groove of guide groove member 54 along cross-loop section 30—6 toward the other reel 31 on which it is being wound.

In the arrangement shown, the guide groove members 51, 54 are shown in the form of roller members each having a groove around its outer cylindrical edge so as to impel the loops of the cross loop section 30 frictionally engaged thereby. The two rollers 51, 54 are shown affixed to a common shaft 55, the ends of which are suitably journalled for rotation in bearings positioned on the base plate 41 and upper mounting bar 42, a driving pulley or roller 56 being likewise mounted on the same shaft 55.

Figure 2:
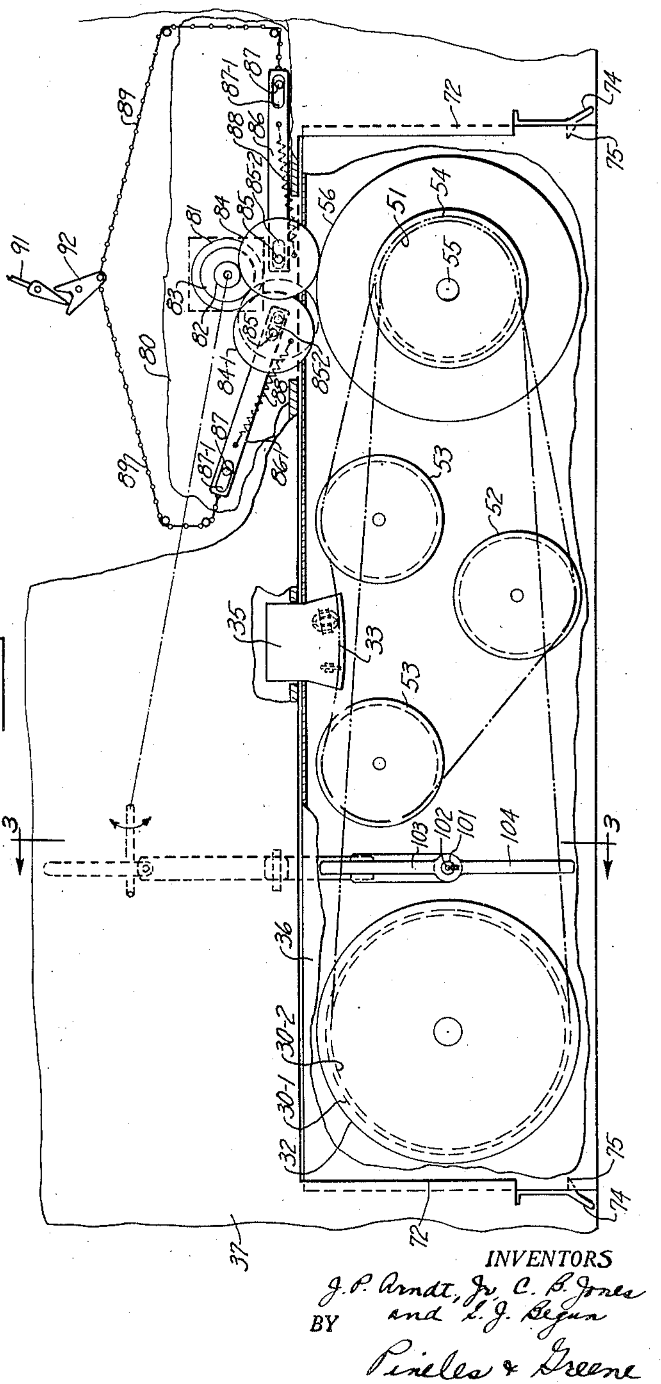
Fig. 2 is a plan view of the device of Fig. 1 with top wall parts broken away and with some of the parts indicated in a diagrammatic manner.

For the sake of clarity, the coils 30—1, 30—2, are shown in Fig. 2 as being of different diameters, although they are indicated in Fig. 1 as being in a position in which they have equal diameters. Similarly, the guide groove of guide roller 54 is shown in Fig. 2 as being of a different diameter than the guide groove of the guide roller 51 although, as shown in Fig. 1, they are of the same diameter.

The guide members 52, 53 may be made in the form of stationary guide groove members so shaped and aligned as to provide guide groove sections along which the moving record track 30 is led toward and away from its operative position along the transducer head 35 while the wire is being reeled along the rollers 51, 54 from one of the reels 31, 32 onto the other. In Figs. 1 and 2, the guide members 52, 53 are shown in the form of revolvably-mounted guide rollers having a central peripheral groove for guiding therein a portion of the cross loop along its proper guide path toward and away from its operative position along the transducer head 35, the rollers 52, 53 being shown held on shafts, the ends of which may be held suitably positioned between the base plate 41 and the mounting plate 42.

In order to secure satisfactory operation of a magnetic recording and reproducing apparatus, the record track guides and impelling mechanism must be so designed as to assure that the magnetic record track is at all times maintained under correct tension, while in motion as well as at rest. Since the outer record track convolutions of the two coils 30—1, 30—2 must move at the same linear speed with which the tensioned cross loop is impelled past the transducer head, the two reels on which the two coils revolve will have the same angular speed only during the short interval while the two coils 30—1, 30—2 have the same diameter, the two reels moving at different angular speeds under all other operating conditions, and the reel with the coil of greater diameter revolving at a smaller angular speed than the reel with the coil of smaller diameter.

In operation of such recording mechanism, substantially the full length of the record track, except for its anchoring ends, may be transported from one reel to the other and it is also essential to be able to stop the motion of the record track at any position.

In accordance with one phase of the invention, the foregoing exacting operating conditions essential for the satisfactory operation of a magnetic recording and reproducing mechanism are secured with the elimination of brakes, clutches and similar complicated energy-consuming elements, by designing the elastically-deformable spring arrangement, which forms a restorably-yieldable, reversible, motion-transmitting biasing connection between two reels, so as to secure the operating characteristics outlined below.

First, the reversible motion-transmitting connection between the two reels is so designed in relation to the length of the record track and the mechanical impedance to its motion from one reel to the other, that when substantially the full length of the signal carrier is stored on one reel (except for the end portions which are attached to the reels), the biasing connection will exert a sufficient initial biasing force, as by the initial elastic deformation of the biasing spring, as to exert on the cross loop a predetermined minimum tension required for maintaining it in its operative position relative to the transducer head.

Second, the reversible motion-transmitting connection between the reels is designed to permit additional yieldable internal motion of its biasing means for taking up the difference in the number of turns which the reels have to make or, in general, their differential rotational motion, when substantially the entire length of the record track is transported from one reel to the other.

Third, the design of the yieldable biasing means must be such that the additional internal motion to which it is subjected by the differential reel motion when the record track is moved from one reel to the other, shall not increase its biasing force to a level at which the increased biasing force will impart to the cross loop an indipendent motion, such as a motion tending to decrease the additional deformation of the biasing means, when the cross loop is not subjected to an external impelling force.

In other words, the increase of the biasing force of the biasing means caused by the differential motion of the reels must be below the level at which it will overcome the mechanical impedance to the motion of the record track when the cross loop is stopped in any intermediate position of a reeling operation in reeling the long record track from one reel to the other.

Figure 4:
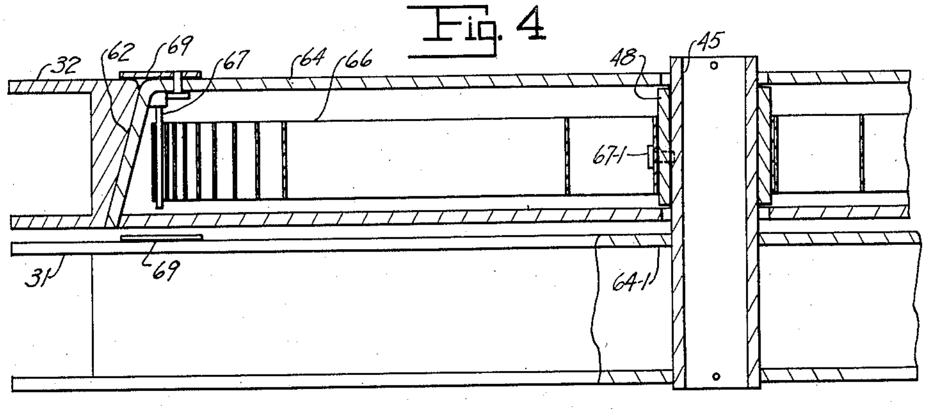
Fig. 4 is a vertical cross-sectional view illustrating one form of a reel structure for a device shown in Figs. 1 and 2.

A double-reel arrangement of the type shown at 31 and 32 in Figs. 1 and 2 may be constructed in the manner indicated in Fig. 4. It has two circular ring-like reel members 31, 32 each having an inwardly facing conical seating surface 62 shaped for detachable mounting on a correspondingly interfitting conical mounting surface of a drum-like mounting shell 64. The reel members 31, 32 may be made of molded synthetic resin material and their conical seating surfaces 62 form a good and positive seating and coupling connection with the correspondingly shaped mounting surface of the drum shell 64 on which it is seated.

The drum shell 64 of reel 32 is indicated as being formed of two circular sheet metal members enclosing an interior compartment within which is housed a spirally coiled spring 66. The outer end of the spring 66 is shown connected as by a pin 67 to the outward peripheral region of one of the drum walls 64. The inner end of the spring is connected by a similar pin 67—1 to a collar 48 secured to the exterior surface of a shaft element 45 on which the two reels are mounted.

The mounting shell 64 with its reel 32 is held in its position on the shaft element 45 by the collar 48 so as to prevent its axial movement along the shaft, but permit its rotation around the shaft element 45 against the biasing action of the restoringly-yieldable biasing means, represented by the spiral spring 66. The other reel 31 is seated on a similar mounting shell 64—1, which, however, is held fast to the shaft 45, being affixed to it, for instance, by one or more key members or by welding. The shaft element 45 is shown hollow so that a series of such double-reel units may be mounted on a long shaft for use in a multiple track recording system, such as described hereinafter in Fig. 12.

The individual double-reel units, such as shown in Fig. 4, may be arranged for mounting on a common shaft so that each double-reel unit is revolvably mounted on the shaft for free rotation thereof. Alternatively, all such double-reel units may have their shaft elements affixed to the common shaft so that they all rotate in unison therewith.

When a reel arrangement, such as described in Fig. 4, is used with a recording arrangement of the type described in Figs. 1 and 2, the spirally wound record track cross loop section 30 will be wound on reel 31 in a positive manner as it is being unwound from the other reel 32 while the two reels are rotated with their shaft element in a clockwise direction or the wire may be in a similar manner wound on reel 32 as it is being unwound from reel 31 while the two reels and their common shaft element 45 are being rotated in a counterclockwise direction.

Each of the reels 31, 32 may be positively locked in its position on its mounting shell as by several flat latch arms 69 each pivotally mounted on the shell wall and held fast in its outward position by a suitable biasing spring not shown so as to remain in the latched position. The edge surface of the latch arm 69 may be shaped so that when the circular reel is lowered to its operative position on its shell, the lower inward edge of the reel will automatically deflect the latch 69 to its inward position permitting lowering of the reel member to its mounting position, whereupon the latch 69 is automatically returned by its biasing spring to its outward latching position. In other words, the outer ends of the latches may be tapered so that when the reel is inserted on the shell, each latch is automatically backed up to its inward retracted position by the conical inner surface of the reel.

In the recording arrangement shown, the record track guide and impelling means and its associated revolvably mounted reels form parts of a self-supporting detachable holder unit designed for detachable intercoupling with driving elements of a driving or motor mechanism in such manner that the coupling connection between the track holder and guide unit and the driving unit is established by bringing the two units towards each other in a direction generally transverse to the axial direction of the reels.

As indicated in Figs. 1 and 2, the driving or motor unit is provided with a shelf-like mounting wall 71 extending in a generally horizontal direction in such manner that the track holder and guide unit 36 may be inserted in a manner analogous to the insertion of a drawer into the drawer opening of a cabinet, the driving unit being shown provided with side wall members 72 having overhanging flanges 73 which retain the drawer in its horizontal position on the mounting wall 71.

The track holder and guide unit 36 is arranged to be automatically locked in its aligned coupled position on the motor unit 37 when placed thereon, for instance, by two spring arm latches 74 secured to the forwardly facing end region of the side wall members 72 of the driving unit and having latch projections 75 which are shaped to enter into latch openings formed in the side walls of the holder unit 36 for interlockingly engaging with the side wall portions thereof bordering the latch openings. The outwardly facing ends of the latch projections 75 are tapered so that when the reel holder unit 36 is pushed inwardly into its operative position on the motor unit, the two latches 74 are pushed outwardly and then automatically returned to their inward latched position when the holder unit 36 is in its operative position indicated in Figs. 1 and 2. The driving unit is shown provided with a driving mechanism which is automatically coupled to the track impelling elements of the holder unit when it is mounted in its operative position on the driving or motor unit.

Figure 4A:
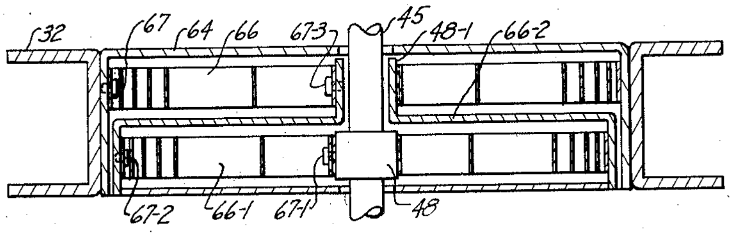
Fig. 4A is a view similar to Fig. 4 of a modified form of reel for such reel structure.

In order to provide for a substantial length of restoringly-yieldable biasing motion in the interconnection between two reels, such as shown in Fig. 4, a plurality of serially connected biasing springs may be provided in the restoringly-yieldable motion-transmitting connection between the two reels. In Fig. 4A is shown a reel corresponding to the upper reel of Fig. 4 of a double reel unit having two serially operative biasing springs 66, 66—1 which are arranged as a part of the motion-transmitting connection between the upper reel 32 and a lower reel 31, such as indicated in Fig. 4 and which is fast on the shaft 45. The several springs 66, 66—1 may be housed in the hollow coupling shell 64 of the reel, and the outer end of the upper spring 66 is shown connected to the peripheral region of the shell 64 as by a pin 67.

The inner end of the upper spring 66 is connected as by a pin 67—3 to a hub-like collar member 48—1 extending from a shell-like housing 66—2 of the next spring 66—1. The outer end of the next spring 66—1 is connected as by a pin 67—2 to the peripheral region of the spring housing 66—2 and the inner end of this spring is shown connected by a pin 67—1 to the collar member 48 of the shaft in a manner analogous to the connection of the spring 47 or 66 to the collar member 48 indicated in Figs. 1 and 4. Any required number of such serially acting spring units may be thus provided in the restoringly-yieldable motion-transmitting interconnection between the two reels of such reel units.

The driving mechanism of Figs. 1, 2 includes a motor unit 81 suitably supported on the under side of a mounting board indicated at 80. The motor 81 may be of the reversible alternating-current type and it carries at its driving shaft end projecting above the mounting board two driving rollers 82, 83, the drive surfaces of which are formed of friction material, such as rubber, arranged in a manner generally similar to turntable motor drives of the type described, for instance, in Patent 2,244,120. A coupling roller 84 having a similar friction rim and rotatably mounted on a pin 85 held by a supporting arm 86 is suitably held and guided by pin-and-slot connections 87, 87—1 with the mounting board 80. Another similar coupling roller 84—1 is similarly mounted on pin 85 and arm 86—1.

Each of the coupling roller arms 86, 86—1 is biased by a spring 88 connected with a portion of the mounting board 80 so that the biasing springs tend to bring each of the two coupling rollers 84, 84—1 into its coupling position in which coupling roller 84 transmits a clockwise rotation of the small motor roller 82 to the reel impelling roller 56 of the reel holder unit for rotating it in clockwise direction and in which coupling roller 84—1 transmits a counterclockwise rotation of the larger motor roller 83 to the impelling roller 56 of the record track impelling unit for impelling it in counterclockwise direction, coupling roller 84 being shown in its coupling position and the other coupling roller 84—1 being shown in its uncoupled position in full lines and in its coupled position by dotted lines.

The two coupling rollers 84, 84—1 are confined to a limited range of movement by the engagement of their pivot pins 85 with suitable openings or recesses 85—2 in the mounting board. The two coupling roller arms 86, 86—1 are interconnected through cables 89 to a control member indicated in the form of a control lever 91 and a cooperating cam lever 92 which is arranged to be tilted by the control lever 91 from a neutral intermediate position to a right or left position, so that in the neutral position of the lever 91, the two cables have sufficient slack to leave both coupling rollers 84, 84—1 in the coupling positions, and that in the right-and-left position of the lever, only the coupling roller 84 or the coupling roller 84—1, respectively, establish the drive coupling connection between the motor and the track impelling roller 56.

In the arrangement indicated, the small motor drive roller 82 is intended to drive the record track impelling pulley 56 through the coupling roller 84 at the proper speed in a clockwise direction for carrying on either a recording or a reproducing process with the record track 30 impelled past the transducer head 35 in a clockwise direction, as seen in Fig. 2. When the other driving connection through the other coupling pulley 84—1 is established, a reversed rotation of the motor drives the record track impelling roller 56 through coupling roller 84—1 in a counterclockwise direction at a multiple of its previous speed, impelling the cross loop 30 in a counterclockwise direction for rewinding the record track on reel 32.

Motor drive units of the general type here shown have been used for phonograph turntable drives as described, for instance, in Conrad Patent 2,264,620. The motor control arm 91 may be combined with a motor energizing circuit in the manner indicated in Fig. 3 so that when the control arm 91 is actuated from its neutral position, one way or the other, the motor 81 is energized to rotate in one direction or the other.

Reversible alternating current motors suitable for such applications are old, one form of such a motor being described in Barrett Patent 2,149,569. The cam lever 92 (Fig. 3) may be operated remotely, as by the electromagnetic action of two relay coils 93, 93—1 which are selectively energized from an energy source indicated by (+) and (−) signs, by a double throw toggle drive control lever 91 so that when the drive control lever is actuated to the right or left, the switch 94 will be actuated to the left or the right for energizing the motor to rotate in one direction or the other while at the same time transmitting through the cables 89 the appropriate roller coupling displacement to one of the rollers 84, 84—1.

When using a magnetic record track in the form of a magnetic wire or filament 30 for magnetically recording or reproducing signals, it is important to assure that the wire is distributed substantially uniformly along the reel when it is transported from one reel to the other. Figs. 1 to 4 illustrate a novel arrangement of such a track distributing arrangement.

A sleeve-like oscillatory member 101 is held free to slide, but prevented from rotary motion by a keyed supporting rod 102 which is suitably held by portions of the holder structure 36, for instance, by mounting connections with the base wall 41 and mounting wall 42 of the holder unit. The oscillatory member 101 carries the pairs of spring arm fingers 103, 104 extending in opposite direction and suitably secured thereto so as to slidingly engage and grip those portions of a cross-over loop 30 of the record track leaving and approaching the two reels 31, 32, respectively, for distributing the successive convolutions of the record track along one reel or the other as it is being wound thereon.

Figure 3:
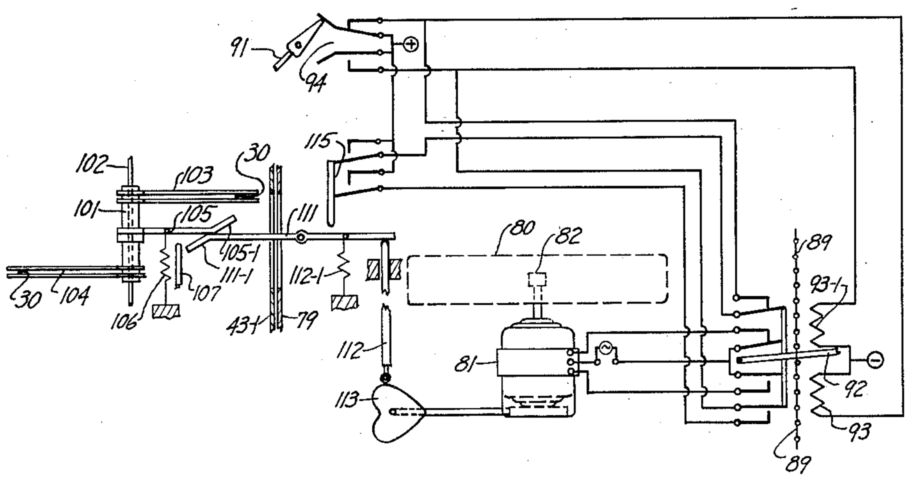
Fig. 3 is a diagrammatic-sectional view along line 3—3 of Fig. 2 showing parts of the level wind mechanism and the electrical control circuits of the drive mechanism.

Fig. 3 shows that the properly correlated up-and-down oscillatory motion is imparted to the oscillatory member 101 through a coupling connection including a coupling member 105 extending from the oscillating member 101 and engaging a coupling portion of an oscillating member 111 to which a properly correlated oscillatory motion is imparted through a slidably mounted follower rod 112 which urged by spring 112—1 rides on a cam surface of a cam member 113 which is rotated at a suitably reduced speed by the motor 81.

The motion-transmitting interconnection between the oscillating rod 101 and the motor 81 which provides the driving forces for impelling the record track and reeling it from one reel to the other is so designed and correlated as to assure that the oscillating member 101 oscillates with the proper amplitude corresponding to the height of the reels, and that the rate of oscillation is such that the successive layers of the track are distributed on the reel on which the track is wound with a degree of uniformity required for satisfactory operation of such systems.

The coupling connection between the level winding oscillating member 101 of the holder unit and the driving unit is so designed and proportioned that when the track holder and guide unit is placed in its operative position with respect to the driving unit, there will always be established the proper coupling connection between the level winding element of the guide unit and the impelling elements of the motor unit.

As indicated diagrammatically in Fig. 3 in the arrangement shown, the oscillating level winding member 101 of the guide unit is biased as by a biasing spring 106 to one of its end positions, such as the lower end position determined by a stop 107 suitably affixed to the base wall 41. The driving oscillating member 111 is shown in the form of a lever which is pivotally mounted on a pivot located in a fixed position of the motor unit, the coupling lever 105 and the oscillating lever 111 of the motor unit having suitably curved guide surfaces 105—1, 111—1 shaped so that when the holder unit 36 is brought into its operative aligned position on the motor unit, the two guide surfaces 105—1, 111—1 will automatically come into engagement with each other and establish their proper coupling connection through which the oscillating member 111 of the motor unit imparts the proper oscillating motion to the oscilwinding oscillating member 101 of the holder unit 36.

The front portion of the oscillatory member 111 of the motor unit projects in front of the front wall 79 of the motor unit through a suitable hole therein, as indicated in Fig. 3, so as to enter through a suitable hole formed in the side wall 43—1 of the holder unit so that when the holder unit is placed in its operative position with respect to the motor unit, the coupling front portion of the oscillating member 111 will automatically establish its proper coupling connection with the coupling member 105 of the level winding oscillating member 101 of the holder unit 36.

Means are also provided to assure that the driving unit can be brought to a stop only when the level winding mechanism associated with the holder unit is in a predetermined position in order to make sure that when the reel holder 36 is uncoupled from the motor unit, its level winding mechanism will always occupy the same position, which in the arrangement shown is the lower end position of the oscillating member 101, in which position it acts against the associated stop 107.

In the arrangement shown, such automatic stopping of the motor is made possible by providing an auxiliary motor control switch 115 having two pairs of contacts which prepare energizing circuits for the actuating relays 93, 93—1 of the motor control arm 91 which auxiliary energizing circuits shunt the control switch 94 in each of its actuating positions.

As shown in the drawings, the energizing circuits of the two relays 93, 93—1 which are established by the closed contacts of the two contact sets of the interlocking switch 115 include in series an additional set of contacts which are operated by the control arm 92 so that the shunting circuits established by the interlocking relay 115 are not completed unless a previous operation of the main control switch 94 has first actuated the motor control arm 92 to one of its operating positions. The operating finger of the interlocking switch 115 is so set and adjusted with respect to the operating arm 111 of the motor unit as to open the auxiliary energizing circuits for the appropriate motor control relay only when the oscillating arm 111 has been brought to the predetermined end position of the oscillating element of the reel holder 36, in the arrangement shown in Fig. 3, the lower position of the oscillating member 101 when it rests against the stop 107.

The self-supporting holder structure carrying the guide and impelling means of a magnetic record track which is impelled by driving forces supplied by a separate motor unit, is shown combined with a separate motor unit having a special transducer head arrangement mounted thereon so that when the record track holder structure is placed in its operative position on the motor unit, a predetermined portion of the record track is automatically threaded through and brought into operative relation with the effective elements of the transducer head.

Aside from the mechanical details of its guide structure, the transducer head construction is not a part of the present invention and may contain an erasing magnetic head and a recording-reproducing magnetic head. The magnetic heads used in the transducer may be of any suitable construction, such as that illustrated in the Begun application, Serial No. 550,573, filed August 22, 1944.

The apparatus of the invention may be used with record tracks of circular cross section or with thin record tracks of oval or flat cross section which may be readily made by subjecting a wire, or, in general, a magnetic record track having circular cross section, to a rolling operation between rollers so as to flatten it. Thus, steel wires of circular cross section, having a thickness of .003 to .008 or even up to .010 inch, when flattened so that one cross sectional dimension is only a third or a fourth of the diameter, have been found to perform, in a recording apparatus of the type described in the present application, as effectively as the same wires of circular cross section, the flattened wire being sufficiently flexible in all directions and its magnetic characteristics being substantially unaffected although it is subjected to levelling forces as it is wound in layers across the reel and undergoes substantial bending action in the direction of its flat surface.

Although in the foregoing arrangement there is described a specific combination of a detachable guide unit with a motor unit adapted to be intercoupled therewith, in which the record track guide unit is moved into coupling position in a directon transverse to the axial direction of the reels, such combination of motor unit with a magnetic head mounted thereon and a detachable record track guide and holder unit, may be also arranged for intercoupling by moving the motor unit and the holder unit into coupling engagement along a direction parallel to the axial direction of the reels, it being merely necessary to provide means for maintaining a length of record track biased in a direction parallel to the axial direction of the reels or in general parallel to the direction to which the units are moved into coupling engagement for assuring that the transducer head region of the record track length is biased into engagement with the open guide channel structure of the transducer head when the track guide and holder unit is intercoupled with the motor unit on which the transducer head is mounted.

With such an arrangement, the track holder and guide unit may be quickly brought into its operative coupling position on the motor unit by bringing it into its latched coupling position, a tensioned length of the record track being held by guide elements of the holder unit in a position in which it is automatically brought and maintained biased into engagement with the guide channel track of the open guide channel structure of the transducer head so that the record track may be guided in a positive manner past the critical gap region of the pole pieces in a manner essential for satisfactory magnetic recording and reproducing.

In Figs. 5 and 6 is shown a modified form of a magnetic recording and reproducing device exemplifying the invention. A double reel unit of the type described in connection with Figs. 1 to 3 is shown revolvably mounted on a shaft 2—11 extending from a base holder plate 2—12 which is held in a predetermined position on the top wall 2—13 of a supporting structure such as a cabinet 2—14 enclosing the motor drive mechanism as well as the amplifier and loudspeakers and control equipment associated with the device.

The base plate is shown provided with a plurality of aligning holes 2—16 shaped for engagement with aligning pins 2—17 extending from the top wall 2—13 of the cabinet. A plurality of lock arms 2—18 pivotally mounted on the top wall 2—13 keep the base plate locked to the top wall, and by turning the lock arms, the base plate and reels may be quickly removed as a unit.

Extending above the top wall 2—13 is a drive shaft 2—21 which is suitably journalled in bearing supports housed within the motor unit 2—14, the lower end of the shaft being provided with a drive pullep 56 similar to that described in connection with Figs. 1, 2 and 3, the drive pulley being selectively driven to rotate in one direction or the other by a motor 81 and coupling rollers 84, 84—1, as in the arrangements of Figs. 1 to 3. To the upwardly projecting portion of the driving shaft is secured an impelling roller 2—23, and a similar additional roller 2—24 is rotatively mounted on another shaft 2—25 suitably supported above the top wall 2—13 of the motor unit.

A magnetic transducer head 2—35 which may be of the general type described in connection with Figs. 1 and 2 is supported on the top wall 2—13 by a bracket 2—26 so that the cross loop 30 of the coiled wire, on being withdrawn from the double reel unit—against the restraining action of the restoringly yieldable motion-transmitting connection between the two reels including an element such as the biasing spring 47—may be looped along the grooves of the two grooved rollers 2—23, 2—24 and placed with the center portion into the guide channel of the transducer head. When the cross loop is so looped around the two rollers 2—23, 2—24, and the guide channel of the transducer head 2—35, the magnetic recording track may be impelled past the transducing head in one direction or the opposite direction by imparting the proper driving forces to the roller 2—23 through its driving connection with the driving pulley 56, to which motor 81 may be coupled to drive it in one or the opposite direction.

A level wind oscillating member 2—101 is slidably guided on two rods 2—102 mounted on and projecting from the supporting wall 2—13. The up and down oscillatory motion is imparted to the level wind oscillator 2—101 by a slidably mounted cam follower pin 112 riding on a cam 113 under the urging of springs 2—106, as in the arrangement of Figs. 1 to 3.

The double reel unit with its base plate may be readily exchanged for another combination of base plate and double reel unit by simply turning the lock arms 2—18 to the releasing position and lifting the base plate with its double reel unit and placing thereon another base plate and reel unit, the operation of unthreading and threading the cross loop 30 of the record track being extremely simple and requiring no skill.

When the cross loop 30 is released from its engagement with the rollers 2—23, 2—24, and the transducer head 2—35, and removed from its engagement with the spring fingers 103, 104 of the level wind oscillator 2—101, it will be retracted against the periphery of the two reels 31, 32. As shown in Figs. 5 and 6, the base plate may be provided with an upwardly projecting catch arm 2—19 having an exposed curved surface 2—20, which catches the intermediate portion of the released cross loop 30 when it is retracted by the reel structure.

In Figs. 7 to 9 is shown another form of double reel unit for a magnetic recording and reproducing device of the general type described in connection with Figs. 5 and 6. The shaft 2—45 which forms a part of the restorably yieldable motion-transmitting connection between the two reels 31, 32, is journalled in one or two bearings suitably held in base plate 3—12 and a mounting plate 3—13 suitably supported, as by posts, above the upper reel 32, to that the shaft 2—45 with the two reels may be rotated for reeling the record track from one reel to the other. The double reel unit with its base plate 3—12 may be located and held in its operative position on the supporting top wall 2—13 of the cabinet, so that the cross loop 30 of the coiled signal track may be withdrawn and looped around the driving roller 2—23, the guide roller 2—24, and the transducer head 2—35 for performing recording, reproducing and rewinding operations in the manner explained in connection with Figs. 5 and 6.

In the arrangement of Figs. 7 and 8, the level wind oscillator mechanism is combined with a double reel unit. It has an oscillating member 2—101 slidingly mounted on two guide rods 2—102 mounted on and projecting from the base plate 3—12, biasing springs 2—106 urging the oscillating member 2—101 to its downward position, as in the arrangement of Figs. 5 and 6. A follower pin 3—15 extending downwardly from the central portion of the oscillating member 2—101 is biased by the springs 2—106 against the upwardly facing cam surface formed by the upper edge of a cylindrical cam member 2—113 having a centrally located stub shaft 3—16 journalled in a bearing member suitably mounted in the base plate 3—12.

The lower end of the stub shaft 3—16 has affixed thereto, a gear 3—17, the teeth of which engage a pinion 3—18 formed at the end of the reel shaft 3—45. The gear ratio of the gears 3—17, 3—18 is such that upon imparting rotation to the reels 31, 32 and their shaft 2—45, the oscillating member 2—101 will be driven through the gears 3—17, 3—18 at the proper rate of speed required in order to distribute the record track filament 30 with the desired degree of uniformity along the reel on which it is wound. There is thus provided a combination of a self-contained and self-supporting, readily removable double reel unit which combines all the elements necessary for assuring that whenever the record track is withdrawn from one reel for performing recording, reproducing and rewinding operations, the level wind mechanism will at all times assure uniform distribution of the signal track on the reel on which it is wound.

The arrangement shown in Figs. 7 and 8 requires the simplest kind and a minimum number of gears for assuring that the level wind oscillator elements are moved in the proper rhythm with relation to the rate at which the wires are reeled from one reel onto the other, with the reels rotating at a much higher rate of speed than the rate of the oscillatory motion imparted to the level wind elements.

A level wind mechanism of the type described in connection with Figs. 7 and 8 may, of course, be used with any of the reel arrangements described herein. When it is desired to combine a level wind mechanism of the type shown in Figs. 7 and 8 with a double reel mechanism unit into a compact unit, the single large gear 3—17, —through which a large speed reduction for the level wind mechanism is obtained in a single speed reduction stage—may be replaced by three or five smaller gears which may be confined substantially in a space underlying an area only slightly larger than the area coextensive with the diameter of the reels 31, 32.

A double reel unit of the general type described above in connection with Figs. 5 to 9 may be combined with the base into a completely enclosed structure, for instance, by enclosing the same with a casing cover 3—36 in the manner indicated in Figs. 7 and 8, the cover being suitably secured as by latches or screws, not shown, to the base plate. The side wall of the casing cover 3—36 is provided with an opening 3—37 indicated in Figs. 7 and 8, to permit withdrawing of the cross loop 30 from its catch arm 3—19. With this arrangement, the cross loop may be readily withdrawn through the opening 3—37 for threading it around the grooved driving and guide rollers and the guide channel of the transducer head.

When it is desired to exchange one double reel unit for another one, it is merely necessary to remove the cross loop from its guide and driving rollers and the guide channel of the transducer head, and release it, whereupon the cross loop is retracted and retained within the housing 3—36 by the catch arm 3—19. The double reel unit may then be replaced by another similar double reel unit, and the cross loop of the new double reel unit may be readily threaded into its proper operative position.

In Figs. 10 and 11 is shown diagrammatically an exemplification of the invention as applied to a magnetic record track formed of a thin, magnetic, spirally-wound wire filament which is stored, guided and impelled in its proper operating condition within a self-supporting detachable guide unit 4—11 designed for detachable interconnection with a driving or motor unit 4—12, which supplies the mechanical power required for impelling the magnetic record track, and which may also be utilized to house the amplifier and the control elements for controlling the recording and reproducing operations.

The guide unit 4—11 comprises a holder structure formed of a casing having a lower casing wall member 4—13 and an upper casing wall member 4—14, suitably secured, as by screws, extending through suitably-thickened wall portions of the casing. The lower casing member 4—13 forms the bottom wall and is rigidly interconnected with a mounting plate 4—16 as by four spacer posts 4—17, and the two walls 4—13, 4—16 form journalling supports for two reel shafts 4—18, 4—19 projecting above the mounting plate 4—16.

The recording arrangement is designed for recording on a plurality of pairs of thin magnetic record track filaments, such as wires 4—20, 4—21. The wire 4—20 is shown stored in spirally-coiled form on two reels 31, 32 which are mounted on the two shafts 4—18, 4—19, respectively, and the wire 4—21 is shown stored on a similar pair of reels 31, 32 mounted on the shafts 4—19, 4—18, respectively.

The two shafts 4—18, 4—19 are coupled in a predetermined positive manner as by a belt or gears, so that when one of the shafts, such as shaft 4—18 is rotated, the other shaft 4—19 is correspondingly rotated, or vice versa. In the particular arrangement shown in Fig. 10, the coupling connection is shown in a diagrammatic manner by a series of interengaging gears 4—31, 4—32 arranged so that when one shaft is rotated in a given direction, for instance, clockwise, the other shaft likewise rotates in the same direction. With this arrangement, the two shafts 4—18, 4—19 with their interconnections, such as the gears 4—31, 4—32, constitute substantially a common shaft connection between each pair of reels 31, 32 on which each spirally coiled record track, such as 4—20, 4—21 is stored, the connection of the two reels 31, 32 to their shafts 4—18, 4—19, including their yieldable motion-transmitting spring connection 47, functioning and being arranged and designed in the same manner as the motion transmitting connection between the two reels 31, 32 described above in connection with Figs. 1, 2 and 4, for maintaining the record track under tension at all times, while permitting each track to be reeled from one reel, for instance, from reel 31 on reel 32, or from reel 32 on reel 31, while an intermediate portion of the record track passes through the operative region of an associated magnetic transducer head 4—40, 4—41.

Each pair of associated reels 31, 32, which are interconnected through a shaft element, may be arranged in the manner described in connection with Figs. 4 and 4A, reel 31 being affixed to the shaft element and reel 32 being connected thereto through a coiled spring, in the manner there explained.

Each of the tensioned magnetic recording wires 4—20, 4—21 is guided under tension past the magnetic pole regions of an associated magnetic transducer head 4—40, 4—41, respectively. Each pair of magnetic heads is shown mechanically connected to each other and to the other pairs of magnetic heads by suitable spacer blocks 4—43 and they are arranged for up-and-down oscillatory movement by mounting two or more pairs of magnetic heads on the end of a substantially rigid flat arm 4—44, the rear end of which is pivotally connected to a support, such as a bracket 4—45 which is secured, as by a screw, to the bottom wall 4—13 of the casing.

In the arrangement shown, the oscillatory up-and-down motion required for assuring level winding of the wires on their reels is imparted to the assembly of the several magnetic heads 4—40, 4—41 through an oscillatory driving connection formed by the oscillatory up-and-down motion of a push rod 4—46 suitably mounted and guided within the motor unit by the cam 113 which may be driven by one of the shafts 4—18, 4—19, suitable biasing means, for instance, a spring 4—47 interconnecting one or more of the mounting arms 4—44 to the associated supporting bracket 4—45 supplying a biasing force which tends to press the magnetic head assembly in a direction opposite to the upward motion of the push rod 4—46.

In the arrangement shown, each pair of record tracks, such as tracks 4—20, 4—21, is so interconnected with the associated two pairs of reels that one track, such as track 4—20, is used for recording or reproducing, while it is wound on reel 31 which is mounted on shaft 4—18 and unwound from reel 32 mounted on shaft 4—19, while the two reels are rotated in clockwise direction, and to record and reproduce from the other track 4—21 when the associated reel 31, which is mounted on shaft 4—19, and its other associated reel 32, which is mounted on shaft 4—18, are rotated in counterclockwise direction, the track being in each case wound on reel 31 and unwound from reel 32.

With such arrangement, the wire 4—20 is wound, during the recording or reproducing process, on reel 31, while it is being rotated in a positive manner by shaft 4—18 in clockwise direction, the wire being maintained under tension by the restoringly-yieldable spring connection 47 between the other shaft 4—19 and reel 32 from which it is unwound, the spring connection being designed in accordance with the principles explained above in connection with Figs. 1, 2 and 4. In an analogous manner, when recording or reproducing signals on wire 4—21, the wire 4—21 is wound on reel 31, while it is rotated in a positive manner by shaft 4—19 to which it is affixed, the track 4—21 being unwound from the other reel 32 which is connected to shaft 4—18 through the restorably-yieldable spring connection 47, so as to maintain the track at all times under tension. The two reel shafts 4—18, 4—19 act in fact as one shaft, and the two reels 31, 32 of each pair of reels associated with a single recording track and the spring interconnection between the reels represents a system which is in equilibrium in each position of the winding and unwinding operations.

Each reel shaft 4—18, 4—19 may be driven by a cooperating shaft 4—61, 4—62 suitably mounted in the casing structure of the motor unit 4—12, each driving shaft being connected to a small motor unit which may be suitably combined with a proper gear reduction mechanism depending on the requirements. Each motor may also be equipped with an auxiliary brake which is automatically biased, as by a spring, to apply the braking power and quickly stop the motor whenever the motor is deenergized, each brake being provided with a brake release magnet for releasing the braking action and permitting the motor to rotate whenever the magnet is energized.

The casing holder structure 4—11 which forms the record track guide unit is also provided with automatic means for indicating the progress of the recording or reproducing operations and for automatically stopping the winding operation when the proper length, for instance, substantially the full length but for an anchoring end portion of the record track, has been moved from one reel to the other.

In the arrangement shown, the compartment between the bottom wall 4—13 and the mounting wall 4—16 is utilized for housing the indicating mechanism which is shown as having a travelling nut pointer 4—51 guided on two spindles 4—52, 4—53 longitudinally along a slit formed on one of the side walls of the casing holder 4—11 for indicating on a scale 4—54 the progress of the winding and unwinding operations. Spindle 4—52 is rotatably mounted and has a thread which is engaged by the nut portion of the travelling nut pointer 4—51 so that the proper rotation of the spindle 4—52 will cause the travelling pointer 4—51 to move along its scale 4—54. The spindle is rotated at the proper rate of speed correlated to the rate at which the wire is being moved from one reel to the other through a gear connection with one of the two shafts 4—18, 4—19, the gear connection being indicated by the bevel gear 4—55 and its connection to gearing housed in the compartment between the bottom wall 4—13 and the mounting wall 4—16 which may be combined with the gearing interconnection 4—31, 4—32 between the two shafts 4—18, 4—19.

The travelling indicator pointer 4—51 is designed to engage and push to one or the other side of the stop blocks 4—56 adjustably affixed to the spindle 4—53 so as to actuate it to the right or the left and cause its ends to operate one or the other of two operating arms 4—57 of interlocking switches 4—58 serving to control the operation of the recording mechanism.

The oscillatory push-rod connection and the interlocking switch arms 4—57 are arranged to form part of the motor unit 4—12 and they extend through suitable holes in the bottom wall member 4—13 into the proper cooperative positions within the structure of the casing-like guide unit 4—11 when the latter is placed in its operative position in the motor unit wherein it is shown held by two automatically operating spring latch arms 4—74. By bending outwardly the two latch arms 4—74, the reel holder unit 4—11 may be readily removed from the motor unit 4—12 and exchanged for another one. A plurality of aligning pins 4—10 extending from the motor unit for engaging corresponding aligning holes in the base wall 4—13 of the guide unit 4—11, assures ready aligning of the two units in their cooperative position.

In Figs. 12 and 13 is illustrated diagrammatically another wire recording mechanism based on the principles of the invention. In this arrangement, two spirally coiled record tracks 4—20, 4—21 are stored on two pairs of reels 31, 32, similar to the corresponding reels of Figs. 1 and 2 which are all mounted for rotation on a common shaft 4—71. A transducer head 4—40 is arranged to cooperate with the record track 4—20 for recording and reproducing when it is wound on its reel 31, while all reels are being rotated in a clockwise direction in a manner analogous to the operation of the corresponding elements of Figs. 10 and 11. In a similar fashion, transducer head 4—41 cooperates with track 4—21 for recording and reproducing when it is wound on its reel 31, while all reels are rotated in a counterclockwise direction. Each record track 4—20, 4—21 is maintained at all times under tension by the action of the biasing springs 4—47 associated with one of its reels.

The intermediate portion of the shaft 4—71 is shown mounted on a mounting structure formed of two spaced wall members 4—75, 4—76 forming a compartment for housing therein an indicating mechanism including a travelling pointer 4—51 which is moved by a suitable speed reducing mechanism driven by the shaft 4—71, a scale 4—54 cooperating with the pointer serving to indicate the progress of the winding and unwinding operations.

The two magnetic heads are shown suitably interconnected by an arm 4—81 of a supporting bracket 4—82 which is guided in an up-and-down oscillatory motion by a guide pin 4—84 and an endless screw member 4—85 extending from the bottom wall member 4—75, the endless screw engaging a suitable nut claw mounted in the bracket 4—82 and being driven by the reduction gearing housed between the compartment walls 4—75, 4—76. The speed reduction mechanism interconnecting the shaft 4—71 with the endless screw 4—85 is so designed as impart to the bracket 4—82 and the two transducer heads 4—40, 4—41, the winglike channel walls of which engage the tensioned moving wires 4—20, 4—21, an up-and-down oscillatory motion correlated to the rate at which the wire is being unwound from one reel to the other and cause the wire to be helically wound up and down along the height of the reel, layer by layer, into a succession of spirally-arranged substantially-level layers.

The reel system of Figs. 12 and 13 likewise requires very little driving power and in the form shown it is designed to be driven by a standard phonograph turn-table disc 4—90 having, for instance, a center pin 4—91 and an auxiliary off-center pin 4—92. The two outer reels 31 are shown as having secured to their outer side walls, as by detachable screws, clamps, or by cementing, fusion or welding, two coupling plates 4—94 shaped for detachable coupling with the coupling pins 4—91, 4—92 of the turn-table disc 4—90 when placed thereon, the coupling plates 4—94 providing for the proper positioning of the level winding mechanism represented by the transducer heads with respect to the top wall 4—95 of the phonograph cabinet on which the reel mechanism may be placed in the operating position.

The arrangement shown also makes it possible to couple either one of the reels 31 associated with the two record tracks 4—20, 4—21 directly to the turn-table disc 4—90 by merely turning the reel mechanism upside down. This arrangement makes it possible to first record or reproduce with the record track 4—20 while it is being reeled on its reel 31 by the turn-table disc 4—90 in clockwise direction, while at the same time the other track 4—21 is being rewound on its reel 32. When it is desired to make a record on the rewound track 4—21, it is merely necessary to lift the reel mechanism and place it in the reversed position on the turn table with the reel 31 of track 4—21 coupled through its coupling 4—94 to the turn-table disc 4—90 so that a new record may be made thereon or a previously made record reproduced.

In order to maintain the mechanism in its proper position on the phonograph table, the supporting structure 4—75, 4—76 is shown provided with a set of legs 4—96, 4—97, the ends of which form rests which engage the top 4—95 of the phonograph cabinet in each of the two operating positions of the reel arrangements.

As shown, one of the legs, namely the main leg 4—96, is shown provided with socket members 4—98 adapted to engage suitable contact pins 4—99 of plug connectors extending from the phonograph top so as to automatically establish circuit connections between the transducing head and the amplifier circuits, such as are usually housed in the phonograph cabinet. No special brakes are needed for stopping the mechanism because the springs 47 are so adjusted that in the end positions of the winding or unwinding operation, the springs are sufficiently tightened to supply the counter torque required for stopping the entire mechanism including the standard phonograph drive motor.

In Figs. 14 and 17 is shown another combination of a double reel unit with a yieldable motion-transmitting connection between the two reels, based on the principles of the invention described in connection with Figs. 1 to 4. Two reels 131, 132 of a type similar to those described in connection with Fig. 4 have coupling drums 133, 134 arranged for detachable coupling engagement with concentric shafts 135, 136, respectively. The coupling drums are indicated as made of two sheet metal plates suitably secured in spaced relation, as by spot-welding, to central sleeve members 137, 138, respectively, adapted to fit and establish a positive driving connection with the two concentrically mounted shafts 135, 136, respectively. The hollow shaft 135 is shown provided at its upper edge with a plurality of coupling teeth 135—1 shaped for engagement with the inwardly bent teeth projections 137—1 extending from the adjoining surrounding portions of the central junction sleeve 137 of the drum 133. The upper end of the inner shaft 136 is shown provided with an oblong key projection 136—1 shaped to establish a driving coupling connection with an oblong central hole formed in the upper wall of drum 134 of the upper reel 132.

With this arrangement, the two reels 131, 132 may be readily mounted on their respective shafts by dropping the drum 133 of the lower reel into its operative coupling position with the hollow shaft 135, and the upper reel 132 may be similarly dropped with its drum 134 into its coupling engagement with the inner shaft 136.

The two concentrically mounted shafts 135, 136 are arranged to be revolvably supported in a supporting structure, such as a cabinet 37 having in its interior, mounting brackets 141, 142 which support bearings 143, 144 in which downwardly extending portions of the two shafts 135, 136 are journalled. There are also provided additional bearing members indicated in simplified form at 145, 146, which provide additional journalling support between the outer shaft 135 and the inner shaft 136.

In Fig. 14 is also shown how to provide a motion-transmitting connection between two reels of a magnetic recording mechanism, which permits extended differential motion between the reels while providing the proper forces between the reels required to keep the record track cross loop 30 tensioned incident to the differential motion between the reels when the diameter of one reel is increasing while the other decreases; and making it possible to permit a large differential motion between the two reels with a spiral spring connection of limited deforming capacity. Although such restorably-yieldable motion-limiting connection may be built in, in the interior of a reel drum structure to occupy the space containing the spring 66 in the reel 32 of Fig. 4, it is shown in Fig. 14 as interconnected between the two concentric shafts 135, 136, designed for cooperation with a pair of readily removable, simple reels 131, 132.

The restorably yieldable shaft interconnection of Fig. 14 has a housing unit 153 secured fast to the lower end of the hollow shaft 135 at its central collar.

One end of a spring 66 similar to the spring of Fig. 4—which provides for a restorably-yieldable motion-transmitting connection between the two shafts 135, 136—has its outer end connected to the housing 153 and its inner end to a collar member 155 which surrounds and is rotatably mounted on a portion of the inner shaft 136. The lower end of the hollow shaft 135 has connected thereto a gear 156 and the collar 155 has connected thereto a generally similar gear 157, a driving interconnection to the inner shaft 136 being provided by two pairs of gears 158, 159 revolvably mounted on a mounting plate 136—1 which is secured fast to the shaft 136 as by a key 136—2, the gears 158, 159 meshing with the gears 156 and 157 respectively.

In the foregoing arrangement, the gears 156, 157 act as sun gears and the two pairs of gears 158, 159 act as planetary gears of a differential gear interconnection forming part of the restorably yieldable motion-transmitting connection between the two reels 131, 132 which includes the spring 66 as a restorably yieldable member. As indicated in Fig. 14, the two sun gears 156, 157 and the cooperating planetary gears 158, 159 have different diameters, the gear ratios being so chosen as to provide a differential motion which makes it possible for one of the reels to make several turns relative to the other reel before the spiral spring 66 makes one turn.

Fig. 17 shows how to use an electric motor in lieu of a spring 66 for providing a restorably-yieldable motion-transmitting connection between two reels, such as reels 131, 132 shown in Fig. 20. An electric motor having a stator 161 and a rotor 162 serves to provide the restorably-yieldable link element which forms part of a motion-transmitting connection between two reels, such as reels 131, 132 connected to the two concentric shafts 135, 136 in the manner shown in Fig. 14.

One motor element, for instance, the rotor 162, has its shaft connected to the shaft 136 to which reel 132 is coupled, and the concentric outer hollow shaft 135 of each reel 131 is coupled to the stator 161 of the motor through a differential gearing including two sun gears 156, 157 and two planetary gears 158, 159, arranged in the same manner as the corresponding elements of Fig. 14. The motor 160 may be an A. C. motor and when it is energized, the torque exerted between the rotor 162 and stator 161 will provide a motion-transmitting connection between the two shafts 135, 136 and their two reels 131, 132, respectively.

By providing a differential gear connection, a very small motor may be used, the differential gear connection providing a mechanical advantage and making it possible to use a small torque motor for providing the required restorably-yieldable motion-transmitting connection between the two reels while permitting practically unlimited differential motion between the two reels.

Fig. 18 shows another form of differential gear arrangement for a motion-transmitting connection of the type described above in connection with Figs. 14 and 17. In this arrangement, the collar 155 which is rotatably mounted on the inner shaft 136 carries two pairs of planetary gears 158—1, 159—1, the planetary gear 158—1 engaging the inwardly facing gears of an inner gear member 156—1 which is fixedly connected to the hollow shaft 135, and the other planetary gear 159—1 engaging the sun gear 157—1 affixed to the inner shaft 136.

The restorably-yieldable member is shown in the form of a spring 66 and has its outer end connected to the housing to which the inner gear 156—1 is connected. The inner end of the spring is connected to a collar 155 rotatable on the shaft 136 and rigidly connected to a bracket member 155—1 carrying the planetary gears. The differential gear arrangement of Fig. 18 performs the same functions as the corresponding elements of Figs. 14 and 17.

A double reel drive arrangement of the type described above in connection with Figs. 14 and 17 makes it possible to remove the two reels 131, 132 with their coupling drums 133, 134 as a unit from their driving connection with the shafts 135, 136 and replace them with a double reel unit if it is desired, for instance, to preserve a recording or play back a recording stored on another such double reel unit. According to the invention, the two reels are so arranged and interconnected that they constitute a self-supporting double reel unit which may be removed as a structural unit from or mounted on their driving coupling connection such as the shafts 135, 136, while assuring that when they are mounted on the driving elements, such as the shafts 135, 136, one reel is free to revolve relative to the other.

In the arrangement shown in Fig. 14, the interconnection between the two reels 131, 132 is formed by a downward extension 138—1 of the central sleeve 138 of the reel drum, the extension 138—1 projecting through an opening in the facing drum wall 133 of the other reel 131, it being retained therein by spinning outwardly the inward edge of the projecting portion 138—1 or by fastening thereto a retaining collar 138—2 which may have an inner threaded surface clampingly engaging a threaded exterior surface of the sleeve extension 138—1.

The hole in the drum shell 133 through which the junction sleeve 138—1 projects is sufficiently larger than the outer diameter of the junction sleeve so that when the two reels are placed in their coupled position on the two concentric shafts 135, 136, the coupling shells 133, 134 of the two reels 131, 132 will be free from any frictional engagement and free to revolve relative to each other.

The double reel unit of the type described above in connection with Fig. 14 is exchangeable in the same manner as the double reel unit 31, 32 described in connection with Fig. 5, differing therefrom by the fact that the two reels 131, 132 of the double reel unit shown in Fig. 14 are not provided with the restoringly yieldable spring connection 47 shown in Fig. 5, the restoringly yieldable motion transmitting connection forming part of the permanent mounting structure of the recording mechanism.

Accordingly, the two reel units 131, 132 may be of simple structure and do not have to embody any elements, such as the spiral springs arranged, for instance, in the manner described in connection with Fig. 4.

The arrangement of Fig. 14 shows also the provision of means for assuring that when the removable double reel unit 131, 132 is uncoupled from its motion transmitting connection represented by the shafts 135, 136 and the spring mechanism interconnected therebetween, the spring is not released from its predetermined tensioned condition. As shown, a locking lever 166 which is pivotally mounted at 167 is biased by a spring to the locking position indicated by the dotted lines 166—0 in which the lower end of the lever engages teeth formed on one of the circular end walls of the spring casing 153 and on a cooperating circular locking plate 168 which is affixed, as by a key, to the inner shaft 136. The lever 166 is biased by a spring 167—1 to the locking position 166—0 and has at its upper end a roller 166—1 arranged to be engaged by the downwardly facing surface of the reel drum 133 for automatically tilting the locking lever to the full-line unlocking position shown and remain therein as long as the removable double reel unit 131, 132 is coupled to its motion transmitting connection 135, 136 and the associated elements which form the operative reel support.

As shown in Fig. 14, the two reels 131, 132 are arranged to permit their detachable mounting on their coupling drums 133, 134. According to one phase of the invention, the interconnection between the coupling drums and the removable reel rims are so designed as to make it possible to remove the two concentric reels from their coupling engagement with the rim of their coupling drums although the corresponding elements of the two reels are all of identical structure and of the same diameter.

To this end, each reel is provided with a conical coupling ring 159, 160 interfitting between the conical inwardly facing coupling surface of each reel 131, 132 and the corresponding conical exterior coupling surface of the associated drums 133, 134, respectively. Each coupling ring 159, 160 is removable from its mounting position on the conical coupling surface of the associated drum member 133, 134 and its radial thickness is so proportioned that when the upper coupling ring 159 is removed, the lower reel rim 131 may be readily lifted away from its position on the associated coupling drum 133.

The arrangement of the removable reel rims makes it possible to store a long spirally coiled record track used for recording only on the removable rimlike member 132 which may be removed from the upper coupling drum after the desired recording or reproducing operation has been performed, it being merely necessary to detach the end portion of the record track cross loop from its connection to the lower reel member 131.

If the recording and reproducing operations with an arrangement, such as shown in Fig. 14, are carried on by reeling the cross loop from the upper reel 132 on to the reel 131, the loop has to be first reeled back on reel 132 for enabling the removal of the record track. By arranging both reel rims 131, 132 for ready removal, it is not necessary to perform such rewinding operation incident to the removal of the reel with the coiled record track thereon, because after lifting the upper reel rim 132 and its coupling ring 159, the lower reel rim 131 with the coiled record track stored thereon may be readily removed, after first disconnecting the end of the wire from the reel 132.

Provision is also made for readily attaching or detaching the end of a record track, such as the end of a thin wire, to or from the removable reel rim member, such as 131, 132. As shown in Fig. 16, the upper side wall of the reel rim 132 may be provided with two upwardly and outwardly tapering tongue members 171 formed, for instance, by punching two slots 172 in the side wall and bending upward the punched out portions of the side wall defined by the slots 172, in the manner indicated in Fig. 16. The end of the wire 30—5 has to be merely threaded through one of the holes opened by the bending of tongues 171 and one or two turns wound so that the turns become wedged between one or both tongues 171 and the adjacent region of the reel wall.

According to another phase of the invention, a double reel unit of the type shown in Fig. 14 having one or two reel rims which are removable from their coupling members, such as the coupling drums 133, 134 through which they are coupled to the motion transmitting connection, are combined with means for manually interlocking the two relatively rotatable elements of the motion transmitting connection prior to removal of the reel member, in order to assure that the spring forming part of the motion transmitting connection remains in its properly tensioned condition.

One form of such manually-operated interlocking mechanism for the relatively rotatable elements of the motion transmitting mechanism is shown in Fig. 14. One of the coupling drums, namely the upper coupling drum 134, serves as a support for a slidably mounted interlocking pin 162, the lower end of which is provided with an elongated barlike interlocking member 161 shaped to enter an interlocking slot 160 formed in the adjacent upper surface of the lower coupling drum 133 so that by sliding the interlocking pin 162 downwardly until its interlocking bar 161 enters the elongated slot 160 of the coupling drum 133 and then rotating the pin 162 90° around its longitudinal axis, the locking bar 161 will establish interlocking engagement between the two coupling drums 133, 134.

The locking pin 162 is shown held positioned within the drum 134 by a sleevelike guide housing 163 having at its bottom wall a hole surrounding the locking pin, the upper portion of the locking pin being provided with an enlargement shown in the form of an ear extending above a collar 176 surrounding the locking pin, a helical biasing spring 165 surrounding the locking pin 162 and extending between the collar 136 and the bottom wall of the sleeve 163, urging the locking pin to its upward position.

A flat grip tab 164 hingedly connected to the ear formed on the upper end of the locking pin 162 makes it possible to readily push the locking pin inward for interlockingly engaging its locking bar 161 with the locking hole 160 of the lower coupling drum 133 as well as for returning the locking bar 161 with its locking pin 162 to the unlatched position. If such manually operated interlocking arrangement is used, it is not necessary to employ the automatically operated interlocking mechanism, such as described above in connection with elements 166, 168, 169.

The invention also contemplates the provision of a lever pivotally held on the upwardly facing side of the coupling member 134 in a position between the upper end of the locking pin 162 and the removable reel rim 132 and arranged so that when the lever overlies the rim 132, the tail portion of the lever releases the upper end of the locking pin 162 to the unlocked position and causes the pin to be automatically pushed downwardly into interlocking engagement with a hole of the lower coupling member 133 when the locking lever overlying the rim 132 is tilted upwardly.

Filamentary magnetic record tracks, such as wires or wire-like ribbons, are extremely thin and are very difficult to handle when released, because they become ensnarled and entangled. It is very difficult to handle such record tracks when an end thereof is left free, for instance, in the case of breakage or in case the record track is disengaged from one of the reels, as for example when on being coiled on one reel, it is completely unwound from the other reel.

According to one phase of the invention, such entangling is prevented by providing a wiper arm resiliently engaging the exterior of the record track in its coiled position on the reel and permitting the reel with the record track to be rotated, while substantially preventing loosening and unwinding of the turns, if a portion of the record track extending between the two reels is broken or if the end of the record track wire is released from the reel from which it is unwound.

Figs. 19 to 21 show one form of such wiper arrangement. A recording mechanism of the type described in connection with Figs. 5 and 6 has a reel mechanism of the type described in connection with Fig. 14 equipped with two reels 131, 132 arranged for detachable coupling to a motion transmitting interconnection including two concentric shafts 135, 136 extending from a motion transmitting mechanism, for instance, such as described in connection with Fig. 17. The two reels 131, 132 of Fig. 19 are similar to the reels of Fig. 14, each reel of Fig. 19 being independently removable from its coupling connection to the respective shafts 135, 136.

The driving connection between reel 132 and the inner shaft 136 is established by the engagement of the shaft tongue 136—1 with a slot of the upper side wall of reel 132. The driving connection between the lower reel 131 and the hollow shaft 135 is established by the teeth formed along the upper edge surface of the hollow shaft 135 and corresponding radial teeth formed along the circular inner edge of the upper side wall of the lower reel 131, in the manner indicated in the central broken out portion of Fig. 20.

Two springs 181, 182, one for each of the two reels 131, 132, are held in position facing the periphery of the two reels by mounting their central portions on an upwardly projecting arm 183—1 of a mounting bracket 183 suitably secured to the mounting support of the mechanism, such as the mounting wall 37 of the casing enclosing the motor and other parts of the mechanism. Each of the two springs 181, 182 has two forwardly projecting arms provided with inwardly-facing, concavely-curved wiper portions 185 floatingly engaging and biased inwardly toward the coils 30—1, 30—2 formed by the two record tracks stored on the two reels 131, 132, so that even when the connecting wire portion 30 extending between the reels is broken or a free end of the wire is released from the reel from which it is unwound, the coil body of the thin filamentary track will be retained in coiled form on the reel and entangling and ensnarling thereof will be positively prevented.

Since the filamentary track used as the magnetic recording medium, such as the wire, is very thin and very difficult to grasp in the fingers, provisions are made to assure that the end region of the filament which is connected to the reel is readily distinguishable and may be readily reached when, on being unwound from one reel, it is retained in coiled form on the exterior of another reel on which it is wound, such as the upper reel 132. The thickness of the filamentary wire ordinarily used as a magnetic recording medium is, in most cases, only about .003 to .008 inch thick.

In accordance with one phase of the invention, the end region of such recording wire filament is coated with a suitable synthetic resin material or cement which makes it perceptibly thicker and increases its exterior to a size which can be readily gripped with the fingers, for instance, by increasing its exterior diameter ten or more times or making its exterior in the form of a ribbon of substantial width. In addition, the synthetic resin covering so formed at the end of the wire is made of a distinctive color which contrasts with the surface appearance of the coiled body so that the end portion of the filamentary record track may be readily seen.

The wiper springs 181, 182 are affixed to the stationary support structure 37 of the mechanism and do not move, and their spring arms 185 have sufficient stiffness so as to exert a positive wiping action for keeping the coiled filament or wire in position when it is broken or the free end thereof is wound on the exterior of the coil, while assuring that excessive pressure is not exerted.

Means are also provided for enabling ready withdrawal of the wiper arms 185 from the position against the reel when a reel is to be removed and for readily releasing the arms 185 from the retracted position when a reel is replaced in its coupled position. Figs. 19 to 21 show one form of such wiper arm retracting mechanism. The bracket 183 has an upwardly extending mounting arm 184 slidingly supporting two sliding members 186 and an operating slider 187 mounted between them, the slider members 186, 187 being slidably held in position against the mounting arm 184 by a cover plate 184—1 suitably secured, as by screws to the upper and lower ends of the mounting arm.

The actuating slider 187 has protruding portions 187—1 fitting into suitable cutouts formed along the facing edge regions of the two slider plates 186 so that when the actuating slider 187 is in the position shown in the drawing, the outer edge surfaces of the two slider members engage the inwardly facing edges of the spring arms 185 of the two springs extending adjacent thereto. The protrusions 187—1 of the actuating slider 187 and the corresponding cutouts are so shaped that when the actuating slider 187 is actuated, for instance, by a push knob 187—2 in upward direction, the two slider plates 186 are pushed outwardly for bending the spring arms 185 to the dot-dash line position 185—1 shown, in which they are retracted from their position within the reels in engagement with the coiled tracks stored thereon.

With this arrangement, it is merely necessary to move the actuating slider 187 by gripping its knob 187—2 and pulling it upwardly in order to bring the two arms of the wiper spring to the retracted dotted line position, whereupon the upper reel 132 may be removed and replaced by another reel. Although the arrangement shown in Figs. 19 to 21 makes provision for simultaneously actuating both springs 181, 182 to their retracted position, such mechanism may be readily designed so as to provide for the retraction of only one spring, for instance, only the upper spring 182, or for the independent retractions of each spring.

The arrangement shown in Fig. 19 makes it thus possible to bring both springs 181, 182 to the retracted, dotted-line position 185—1 by a single motion, whereupon the upper reel 132 as well as the lower reel 131 may be individually removed from their coupling connection to their motion transmitting connection. After replacing one or both reels, the wiper springs may be returned to their inward reel position shown in full lines by another simple motion imparted to the slider knob 187—2.

Fig. 22 illustrates the end lead of a filamentary magnetic track 39 provided with a thickened covering 39—7 of the type described above, a short end portion of the lead 39—6 being left without a covering or preferably with a thinner covering of a thickness and length suitable for winding one or two turns thereof around the gripping tongues 171, in the manner explained above in connection with Fig. 16.

In Figs. 23 and 24 is shown another combination of a reel mechanism for a magnetic recording system with wiper means for assuring that the coiled track stored on the reel does not become loosened and entangled in the event the filament is broken or a free end thereof is released from the other reel. Two reels 131, 132 are arranged for detachable coupling to a reel motion transmitting connection including two concentric shafts 135, 136 extending above the exposed wall 37 of a mounting casing of the recording mechanism. Each reel 131, 132 is equipped with a floating spring member 6—11, the height of which is approximately equal to the height of the reel space in which the coiled record track is stored.

Each spring 6—11 is bent into generally U-shaped curved form so that its two outer end arms engage the outer periphery of the coiled record track stored on each reel throughout the range of the reeling operation indicated, for instance, in Fig. 24 by the broken circular line 39—3 representing the outer diameter of the coil, and the similar broken line 39—4 representing the inner diameter of the coil. The springs have sufficient stiffness to assure that the coiled record track is positively embraced by the wiper arm portions 6—12 throughout the entire range of the reeling operation, the dash-triple-dot line 6—13 indicating the inwardly flexed position of the spring arms when the coil reaches its position of minimum diameter.

The springs 6—11 are of non-magnetic material, such as brass, Phorphor bronze or a non-magnetic steel. Furthermore, the spring is so arranged and shaped that when it is pushed, from the position shown, inwardly, its substantially entire length is confined within the periphery of the reel in the manner indicated by the dash-three-dot line 6—14.

In the operation of the recording mechanism, the spring is held in its outer position with a portion thereof affixed to a stationary part of the mounting mechanism, such as the mounting wall 37, for instance, by a bracket arm 6—15 clampingly engaging the central portion 6—16 of the spring. The clamping means associated with the bracket member 6—15 are of such construction as to make it possible to readily withdraw the spring 6—11 from its inner position 6—14 to its outward position and quickly clamp a part of the spring in a fixed position in which only the wiper ends of the spring engage the reel and permit the reel to freely rotate with the coil while the wiper arms prevent loosening of the coiled record track.

The clamping means shown are formed of two hooks 6—21 slidingly held in elongated slots 6—22 of the bracket arm 6—15 between an operating knob 6—23 and a retaining plate 6—24 slidingly engaging the opposite sides of the bracket arm 6—15. Biasing means, such as a spring 6—25, hold the two hooks 6—21 in the upward position of their slots 6—22 so that the hooked ends 6—26 clampingly engage and hold locked the central portion of the spring, against the fixed bracket arm 6—15.

The central portion of the spring is shown reinforced by an outer reinforcing plate 6—27 and has formed therein holes 6—28 on the same level as the slots 6—22 of the bracket arm, through which the hook ends 6—26 of the hooks 6—21 may enter when the two hooks 6—21 are pushed downwardly to the lower position of their slots 6—22 in which position the spring may be removed from its locked position.

The hooked ends 6—26 of the two hook shanks 6—21 are shown beveled so that when the central portion of the spring is withdrawn from its inward position within the reel and gripped on its inward concave side by a finger and pushed outwardly, the holes 6—28 of the spring acting on the inclined exterior surfaces of the two hooks will automatically push them downwardly until the central portion of the spring 6—16 with its backing plate 6—27 has been brought against the bracket arm, whereupon the hooked ends 6—26 of the two hooks 6—21 will be automatically returned to their clamping locked position in which they hold the central portion of the spring firmly clamped against the bracket.

As indicated in Fig. 23, the central portion of the spring may also be provided with locking clips 6—29 of spring metal, bent so that when the spring is in its inward position, the ends of the locking clips will enter and engage a retaining slit 6—31 formed on the edge region of the reel so as to positively retain the spring on the reel and keep it locked in its inward position when the reel with its spring are dismounted from the mechanism for storing or otherwise handling in a position removed from the mechanism.

Depending on the character of the machine with which a given reel is used, it may be necessary to hold the spring in different peripheral positions during the operation of the recording mechanism. The peripheral position of the spring will usually be so chosen as to permit the record track 39 to be withdrawn without interfering with the pressure exerted by the spring. By providing a plurality of brackets located in different peripheral positions, as indicated by the dotted lines 6—15—A, 6—15—B, provision may be made for accommodating the different operating conditions.

The combination arrangement of a removable reel and an associated wiper member, which is automatically removed with the reel when the reel rim or the entire reel, that is, the reel rim with the reel drum, is removed from the driving mechanism to which the reel may be quickly coupled, may be also used with a recording mechanism in which two laterally spaced rotatably mounted reels are driven by a driving mechanism housed in a casing from which the two reel shafts project and arranged in the general manner indicated in Fig. 25.

The motor mechanism may be of the type described in connection with Fig. 10. As shown in Fig. 25, the two shafts 4—61, 4—62 of a motor mechanism, such as described in Fig. 10, are arranged to project above the exposed wall 37 of the motor casing. The upwardly projecting shafts 4—61, 4—62 are arranged so that two reels 131, 132 of the general type described above may be readily coupled or uncoupled from the shaft ends, for instance, by providing a splined connection between the shaft and the center element of the reel. Thus, the exposed upper end of the shaft may be provided with a grooved cylindrical surface for interengagement with a suitably grooved inner surface of a cylindrical bore formed in a central member of the reel. Each reel is equipped with its wiper member 6—11 which is removable with the reel and which is arranged in the same manner as described in connection with Figs. 23 and 24 so that it may have a portion thereof, such as a central or an off-center portion, quickly clamped or unclamped from a clamping bracket 6—15 suitably affixed to the mounting wall 37. In a similar manner, the wiper reel combination arrangement of Figs. 19 and 20 may be applied to a reel drive mechanism of a magnetic recording device of the type shown in Fig. 25.

In Figs. 26 and 27 is shown another combination of a reel mechanism for a magnetic recording system with wiper means for assuring that the coiled track stored on the reel does not become loosened and entangled in the event the filament is broken or a free end thereof is released from the other reel. Only the upper reel 132 is shown and it is combined with wiper means in the form of a spring 7—10 of the same general character as that described in connection with Figs. 23 and 24.

The spring 7—10 is removable as a unit with the reel 132 and is carried by a carrier member 7—12 which is movably joined to the reel so that the reel is free to rotate in its operative position relatively to the carrier member 7—12 and to the spring, while a portion of the carrier member is affixed to a mounting support, such as the exposed wall 37 of the motor mechanism so as to hold the spring in its proper operating position with respect to the reel and the coiled record track stored thereon.

In the arrangement shown, the carrier member is formed of a sheet metal member bent into U-shape so as to provide an intermediate portion extending axially across the height of the reel adjacent the rim portion thereof and two side arms 7—14 overlying the side walls of the reel. The central portion of the spring 7—10 and of the carrier member 7—12 extend cross-wise to each other and are secured to each other as by welding, so that when the portions of the carrier side arms 7—14 are held in suitable positions with respect to the center of the reel, the end portions 7—11 of the spring will maintain proper engagement with the coiled signal track stored on the reel throughout the entire range of the reeling operation.

Various constructions may be used for providing a connection between the central part of the reel 132 and the carrier arms 7—14 in such manner as to permit the reel to be rotated relatively to the carrier arms 7—14, while assuring that when the reel is uncoupled from the shaft 7—36, the carrier with the spring carried thereby in its proper relation to the reel is removed therewith and held at all times in position on the reel with its end portions 7—12 engaging the record track stored thereon in coiled form. In the arrangement shown, the connection is formed by making the central sleeve member 7—38 of the reel through which it is detachably coupled to its drive shaft 7—36 with projecting end portions extending through holes in the carrier arms 7—14, the end regions of the sleeve being enlarged as by swaging so as to overlap the openings in the arms 7—14 and retain the carrier member on the reel. The carrier arms 7—14 are made of material, such as metal, of sufficient stiffness and the holes have sufficient clearance so as to assure that the reel may rotate freely within the holes when the carrier is held fixed by a support extending from the mounting wall 37 of the mechanism.

Means are also provided for making it possible to automatically clamp a portion of the carrier 7—12 in a fixed position when the reel member with the carrier 7—12 are coupled to the shaft and for permitting ready unclamping of the wiper carrier when the reel is uncoupled therefrom. In the arrangement shown, the clamping means are formed by a clamping bracket 7—21 suitably affixed to the exposed supporting wall 37 of the mechanism and having an arm 7—22 extending upwardly along the exterior of the central portion of the wiper carrier 7—12 and two cooperating projecting arms 7—23 forming with the adjacent portions of the bracket arm 7—22 recesses 7—24 within which wing-like projections 7—18 of the carrier 7—12 are retained. The wing-like projections 7—18 are shown provided with holes 7—19 shaped so as to come into interlocking engagement with interlocking projections 7—25 suitably held by a biasing spring 7—26 which is secured to the bracket member 7—21 so as to urge the locking projections through suitable openings in the bracket arm 7—22 into engagement with the holes 7—19 of the carrier wings 7—18 when the latter are pushed into the recess 7—24 incident to the coupling of the reel 132 to its shaft 7—36.

The inward ends of the latch projection 7—25 are inclined so that when engaged by the lower edges of the wing portions 7—18 of the wiper carrier during the insertion thereof into the locking recess 7—24, the latch projections with their biasing spring 7—26 are pushed out of the path of the wing projections, the biasing spring returning the latch projections to their inward position when the holes 7—19 of the wing projections 7—18 have been lowered to the level of the latch projections. Obviously, the latch projections may be provided with inclined edges on the upper as well as on the lower side so that by gripping the carrier member and pulling it upwardly, the locking projections are automatically backed away in a manner analogous to that described above in connection with the insertion of the wing-like locking projections into the recess and the automatic establishment of interlocking engagement between the holes 7—19 with the locking projection 7—25.

As described in connection with the arrangement of Figs. 23 and 24, different peripheral regions of the mounting wall 37 may be provided with such brackets for making it possible to locate the end regions 7—11 of the wiper arms in a position best suited for guiding the record track 30 towards or away from its coiled position on the reel.

There have been described above in connection with Figs. 1 and 4 and 14 to 18 a reeling mechanism for a magnetic recording arrangement having a special motion-transmitting connection between the two reels so arranged that when an intermediate length of a long record track, which is stored in the form of two coils on the two reels, is withdrawn from one reel, the motion-transmitting connection will cause the other reel to rotate at such speed, correlated to the difference in the diameters of the two coils, as to wind thereon a length of record track sufficient to assure that the intermediate portion of the record track extending between the two reels is maintained at at least predetermined minimum tension essential for satisfactory operation of such recording arrangement. Fig. 28 illustrates the principles of another form of such motion transmitting connection for a reel mechanism of such magnetic recording device.

A long coiled magnetic recording track 30 is stored in the form of coils 30—1, 30—2 on two reels 8—31, 8—32 which are indicated as arranged for detachable coupling as by means of splined shaft coupling connections to two concentric shafts 8—35, 8—36. Suitable means, not shown, are provided for revolvably mounting and supporting the two shafts 8—35, 8—36, and the recording arrangement may be designed for operation in a manner analogous to that described, for instance, in connection with Figs. 5 and 6, except that in the arrangement shown in Fig. 28, the signal track forms counterclockwise wound coils on both reels, the intermediate signal track loop 30 connecting the two coils being looped over a grooved guide pulley 8—37 which may be connected to a driving motor for impelling the record track past the transducer head. With such arrangement, reel 8—31 will rotate in clockwise direction when the record track is wound thereon, while reel 8—32 is rotating in counterclockwise direction in unreeling the record track as indicated by the arcuate arrows applied to the two reels.

The two shafts 8—35, 8—36 form part of a motion-transmitting connection including a differential torque mechanism 8—40 which applies a differential torque for maintaining the intermediate signal track loop 30 tensioned throughout the reeling operation, notwithstanding the differences of the diameters of the two coils 30—1, 30—2 and the different angular speed with which they have to rotate in order to maintain the wire under a predetermined minimum tension.

The special torque mechanism 8—40 comprises a ball bearing assembly having a set of balls 8—42 running between two ball races 8—43, 8—44, the balls being retained between the two races by a ball cage 8—45. The ball bearing assembly is held in its proper operative position between two coupling members 8—46, 8—47, the lower of which is affixed, as indicated, by a key, to the shaft 8—36 and the upper coupling member 8—47 being similarly affixed to the other shaft 8—35. The bearing assembly is of the tight fit type and so designed that when one of the shafts is rotated, for instance, the shaft 8—36 in counterclockwise direction, as indicated by its arrow, while the cage 8—45 is held stationary, the frictional forces between the race 8—44 and the balls 8—42 will impart to the balls a rotation which causes them to drive the other ball race 8—43 and therethrough the other shaft 8—36 in clockwise direction and vice versa.

There are further provided means for imparting to the ball members a motion so correlated to the motion of the two shafts as to cause the shaft carrying the reel on which the record track is wound to be moved at all times at the proper differential speed correlated to the diameter of the coils on the two reels for assuring that the wire is at all times maintained under tension. Thus, assuming that the diameter of the coil on reel 8—32 is smaller than the diameter of the coil on reel 8—31, in which case reel 8—32 will have to rotate at an angular speed proportionally larger than the speed of reel 8—31, means are provided for imparting to the balls 8—42 a speed at least as great as the greatest difference of angular speed with which the two reels have to be rotated in order to maintain the wire under tension.

In the arrangement shown, the additional driving forces are imparted to the ball members 8—42 by making the ball cage 8—45 a part of a belt pulley 8—51 and driving the pulley through one-way coupling connections to the shaft 8—36 in such manner that irrespective of the direction of rotation of the shaft 8—36, the ball cage pulley 8—51 is always rotated in the same direction at an angular speed equal at least to the maximum differential speed with which the two reels have to be rotated in order to maintain the record track under tension throughout the range of the reeling operation.

In the form shown, the driving connection between the shaft 8—36 and the ball cage pulley 8—51 includes two pulleys 8—52, 8—53 which rotate with the shaft 8—36, being shown affixed thereto as by keys, two cooperating pulleys 8—54, 8—55 being mounted on an auxiliary shaft 8—56 to which is shown affixed another pulley 8—57 which is shown drivingly connected as by a belt 8—58 to the ball cage pulley 8—51. Pulleys 8—54, 8—55 are part of one-way coupling connections or clutches interposed between the driving pulleys 8—52, 8—53 of the shaft 8—36.

In the form shown, the coupling connection includes a coupling sleeve 8—61 shown affixed as by a key to the auxiliary shaft 8—56 and helical spring members 8—62, 8—64 extending from the two coupling pulleys 8—54, 8—55 and slung around the coupling sleeve 8—61 in such direction that only when coupling pulley 8—54 is driven in clockwise direction, as indicated by the clockwise arrow applied thereto, will spring 8—62 couple sleeve 8—61 and auxiliary shaft 8—56 to coupling pulley 8—54 for rotation therewith in clockwise direction only, the coupling connection being broken if coupling pulley 8—54 is rotated in counterclockwise direction.

In an analogous manner, spring 8—64 is connected to the other coupling pulley 8—55 and so slung around the coupling sleeve 8—61 that only when coupling pulley 8—55 is driven in clockwise direction, will it be coupled by the tightened spring 8—64 to the coupling sleeve 8—61 and therethrough to the auxiliary shaft 8—56 for rotating it in clockwise direction. The coupling connection between the coupling pulleys 8—54 and 8—55 to the shaft 8—36 of the reel mechanism is shown completed by a straight belt connection 8—65 and a cross belt connection 8—66, respectively, so that rotation of the shaft 8—35 will impart a corresponding rotation to the coupling pulley 8—54 and a rotation in the opposite direction to coupling pulley 8—55.

With the above-described coupling connection between the shaft 8—36 and the cage pulley 8—51, rotation of the shaft either in clockwise or in counterclockwise direction will always impart to the ball cage pulley a rotation in the same direction, namely, in the case indicated, in clockwise direction. The diameter of the several pulleys 8—51, 8—52, 8—53, 8—54, 8—55, 8—57 is so proportioned and designed that the ball cage is rotated at a speed correlated to the rotation of the two shafts or the reels, respectively, as to assure that the reel having a coil of the minimum diameter determined by the inner layer of the coil track stored thereon will be rotated at an angular speed sufficiently greater than the other reel to assure that the signal track is maintained under tension under all operating conditions. Such bearing arrangement will also provide sufficient friction to permit slippage over the required range of differential speed to take care of the entire range of operation.

A frictional driving arrangement of the type described above in connection with Fig. 28 will also be effective in maintaining the proper differential speed between the two reels if the coil is stored on the two reels 8—31, 8—32 in the same manner as that described in connection with Figs. 1 and 2, so that both reels are rotated in the same direction when performing a reeling operation.

As in the case of the reel motion-transmitting arrangement described in connection with Figs. 1, 4 and 14 to 18, the arrangement of the type described in connection with Fig. 28 may be also used for driving a reel mechanism of the type described in connection with Figs. 10 and 25 having two reels driven by two laterally spaced shafts, such as reel 8—31 driven by shaft 8—36 and reel 8—71 driven by shafts 8—72. In order to provide such two reels 8—31, 8—71 with a motion-transmitting connection of the type shown in Fig. 28, it is merely necessary to provide the shaft 8—35 with an additional coupling connection to shaft 8—72, such coupling connection being shown formed of a pulley 8—73 affixed to the shaft 8—35, a pulley 8—74 affixed to shaft 8—72 and a belt 8—75 interconnecting the two pulleys.

With such arrangement, it is merely necessary to connect the shaft 8—36 with a simple small motor 8—81 in the manner indicated in Fig. 28 for driving and operating a recording mechanism provided with such two reels 8—31, 8—71. If a simple reversible motor 8—81 is used, it may be combined with a brake and the single brake with the reversible motor leads may be controlled by a switching arrangement for controlling the reeling operation in both directions.

The magnetic recording devices and systems described herein in connection with the exemplifications of the present invention embody various other inventive features which are claimed in the applications Serial No. 550,570, filed August 22, 1944, now abandoned, Serial No. 550,572, filed August 22, 1944, now abandoned and Serial No. 550,573, filed August 22, 1944, now abandoned.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

We claim:

1. In a magnetic record transducing apparatus for transducing magnetic signals on a moving magnetic record track by magnetic flux interlinkage between a magnetic record transducer structure and successive elemental portions of the track: two revolvably mounted reels; an elongated filamentary magnetic record track having its end portions held respectively on said two reels and an intermediate portion extending between said reels so that when said track is wound on one reel it is unwound from the other reel, the change in the amount of track wound on a reel changing the diameter of the winding on the reel and the required relative speed of rotation of the reels; said reels forming part of guide means including impelling means for guiding and impelling an intermediate track portion of said record track along a predetermined path past said magnetic transducer structure and level wind guide structure for cyclically winding the record track turns on the reels in level layers of turns; said filamentary record track being of small cross section and having a tendency to break under the action of impelling forces; a drive unit including a motor and rotatable power take-off elements for supplying power to the said impelling means; a restorably-yieldable, reversible energy transmitting interlinkage between said reels for causing the rotation of one reel to drive the other reel at such differential speed correlated to the diameters of the reel windings as to reel the record track from one reel to the other and maintain the intermediate track portion under tension during the reeling of substantially the entire length of said track; the revolvable mountings of the two reels being readily detachable from the drive unit and arranged for quickly and easily removing both reels together, and the restorably-yieldable, reversible energy transmitting interlinkage including restraining means for preventing the dissipation of energy by the interlinkage when the reels are disengaged from the drive unit.

2. In a magnetic record transducing apparatus for transducing magnetic signals on a moving magnetic record track by magnetic flux interlinkage between a magnetic record transducer structure and successive elemental portions of the track: a reel assembly containing two revolvably mounted reels; an elongated filamentary magnetic record track having its end portions held respectively on said two reels and an intermediate portion extending between said reels so that when said track is wound on one reel it is unwound from the other reel, the change in the amount of track wound on a reel changing the diameter of the winding on the reel and the required relative speed of rotation of the reels; said reels forming part of guide means including impelling means for guiding and impelling an intermediate track portion of said record track along a predetermined path past said magnetic transducer structure and level wind guide structure for cyclically winding the record track turns on the reels in level layers of turns; said filamentary record track being of small cross section and having a tendency to break under the action of impelling forces; a drive unit including a motor and rotatable power take-off elements for supplying power to the said impelling means; a restorably-yieldable, reversible mechanical interlinkage between said reels for causing the rotation of one reel to drive the other reel at such differential speed correlated to the diameters of the reel windings as to reel the record from one reel to the other and maintain the intermediate track portion under a limited tension during the reeling of substantially the entire length of said track; the reel assembly and the drive unit having cooperating structures for ready detachable interengagement with each other; the power take-off elements being detachably connected to the impelling means, and the restorably-yieldable, reversible energy transmitting interlinkage including restraining means for preventing the dissipation of energy by the interlinkage when the reels are disengaged from the drive unit.

3. In a magnetic record transducing apparatus for transducing magnetic signals on a moving magnetic record track by magnetic flux interlinkage between a magnetic record transducer structure and successive elemental portions of the track: two revolvably mounted reels; an elongated filamentary magnetic record track having its end portions held respectively on said two reels and an intermediate portion extending between said reels so that when said track is wound on one reel it is unwound from the other reel, the change in the amount of track wound on a reel changing the diameter of the winding on the reel and the required relative speed of rotation of the reels; said reels forming part of guide means including impelling means for guiding and impelling an intermediate track portion of said record track along a predetermined path past said magnetic transducer structure and level wind guide structure for cyclically winding the record track turns on the reels in level layers of turns; said filamentary record track being of small cross section and having a tendency to break under the action of impelling forces; a drive unit including a motor and rotatable power take-off elements for supplying power to the said impelling means; a restorably-yieldable, reversible mechanical interlinkage between said reels for causing the rotation of one reel to drive the other reel at such differential speed correlated to the diameters of the reel windings as to reel the record track from one reel to the other and maintain the intermediate track portion under a limited tension during the reeling of substantially the entire length of said track; the revolvable mountings of the two reels being directly on and readily detachable from the power take-off elements, and arranged for quickly and easily removing both reels together, and the restorably-yieldable, reversible energy transmitting interlinkage including restraining means for preventing the dissipation of energy by the interlinkage when the reels are disengaged from the drive unit.

4. The apparatus of claim 3 in which the reels are independently mounted in closely-spaced coaxial relation to each other for the ready simultaneous removal of both reels by a single axially directed removal operation.

5. The apparatus of claim 3 in which the reels are independently mounted on vertical axes in closely-spaced coaxial relation to each other for the ready simultaneous removal of both reels by a single axially directed removal operation.

6. The apparatus of claim 2 in which the reels are coaxially mounted in the reel assembly.

7. The apparatus of claim 2 in which the reels are laterally spaced in the reel assembly.

8. The apparatus of claim 2 in which the reels are coaxially mounted in the reel assembly, and the magnetic record transducer structure and the record track guide and impelling means form part of the detachable reel assembly.

9. The apparatus of claim 2 in which the reels are laterally spaced in the reel assembly, and the magnetic record transducer structure and the record track guide and impelling means form part of the detachable reel assembly.

10. The apparatus of claim 2 in which the magnetic record transducer structure, the record track guide and impelling means, and the record track level wind means form part of the detachable reel assembly.

11. The apparatus of claim 2 in which the level wind guide structure forms part of the reel assembly, the drive unit contains level wind guide drive means for driving the level wind guide structure, and the said motor is controlled by switch means having cooperating elements preventing stopping of the motor when the level wind guide structure is spaced from a predetermined point in its cycle.

12. The apparatus of claim 1 in which the restorably-yieldable reversible energy transmitting differential drive includes coil spring structure for maintaining said record track tension.

13. The apparatus of claim 1 in which the restorably-yieldable reversible energy transmitting differential drive includes relatively rotatable elements of electric motor means for maintaining said record track tension.

14. The apparatus of claim 1 in which the reversible energy transmitting differential drive includes oppositely rotatable friction structures arranged to transmit impelling forces to the reels, rotatable elements frictionally engaged with both friction structures for causing the rotation of one friction structure to urge the other friction structure to rotate in the opposite direction and torque applying means for urging the relative rotation of the rotatable elements, and maintaining said record track tension.

15. In a magnetic record transducing apparatus for transducing magnetic signals on a moving magnetic record track by magnetic flux interlinkage between a magnetic record transducer structure and successive elemental portions of the track; two pairs of revolvably mounted reels; two elongated filamentary magnetic record tracks each having its end portions held respectively on a different pair of said reels and an intermediate portion extending between said reels so that when each of said tracks is wound on one reel of a pair of reels it is unwound from the other reel of the pair, the change in the amount of track wound on a reel changing the diameter of the winding on the reel and the required relative speed of rotation of the reels of each pair; said reels forming part of guide means including impelling means for guiding and impelling an intermediate track portion of said record track along a predetermined path past said magnetic transducer structure and level wind guide structure for cyclically winding the record track turns on the reels in level layers of turns; said filamentary record tracks being of small cross section and having a tendency to break under the action of impelling forces; a drive unit including a motor and rotatable power take-off elements for supplying power to said impelling means; a restorably-yieldable, reversible mechanical interlinkage between the reels of each pair of reels for causing the reels onto which the tracks are wound to drive the reels from which the tracks are unwound, at such differential speed correlated to the diameters of the reel windings as to maintain the intermediate track portions under a limited tension while winding substantially the entire length of said tracks from one reel of each of said pair of reels onto the other; the revolvable mountings of the said reels being readily detachable from the drive unit and arranged for quickly and easily removing all the reels together; the pairs of reels being interconnected for causing winding of one record track to effect winding of the other record track, and enabling one track to be wound in the transducing direction while the other record track is simultaneously wound in the rewind direction.

16. In a magnetic record transducing apparatus for transducing magnetic signals on a moving magnetic record track by magnetic flux interlinkage between a magnetic record transducer structure and successive elemental portions of the track: a reel assembly containing two pairs of revolvably mounted reels; two elongated filamentary magnetic record tracks each having its end portions held respectively on a different pair of said reels and an intermediate portion extending between said reels so that when each of said tracks is wound on one reel of a pair of reels it is unwound from the other reel of the pair, the change in the amount of track wound on a reel changing the diameter of the winding on the reel and the required relative speed of rotation of the reels of each pair; said reels forming part of guide means including impelling means for guiding and impelling an intermediate track portion of said record track along a predetermined path past said magnetic transducer structure and level wind guide structure for cyclically winding the record track turns on the reels in level layers of turns; said filamentary record tracks being of small cross section and having a tendency to break under the action of impelling forces; a drive unit including a motor and rotatable power take-off elements for supplying power to said impelling means; a restorably-yieldable, reversible mechanical interlinkage between the reels of each pair of reels for causing the reels onto which the tracks are wound to drive the reels from which the tracks are unwound, at such differential speed correlated to the diameters of the reel winding as to maintain the intermediate track portions under a limited tension while winding substantially the entire length of said tracks from one reel of each of said pair of reels onto the other; the reel assembly and the drive unit having cooperating structures for ready detachable interengagement with each other; the power take-off elements being detachably connected to the impelling means; the pairs of reels being interconnected for causing winding of one record track to effect winding of the other record track, and enabling one track to be wound in the transducing direction while the other record track is simultaneously wound in the rewind direction.

17. The apparatus of claim 16 in which the reel assembly and the drive unit cooperating structures are arranged for the mounting of the reel assembly in two different positions on the drive unit for causing rotation of the record tracks in opposite directions with unidirectional rotation of the power take-off elements.

18. The apparatus of claim 1 in which the reels are in the shape of annular rings and the power take-off elements are shaped to fit inside and engage each ring said power take-off element providing a connection between said reels and said restorably-yieldable interlinkage.

19. The apparatus of claim 1 in which the reels are in the shape of annular rings, the power take-off elements are shaped to fit inside and engage each ring, and the restorably-yieldable reversible mechanical interlinkage includes restorably-yieldable elements located within the drive unit.

20. The apparatus of claim 1 in which the reels are in the shape of annular rings, the power take-off elements are shaped to fit inside and engage each ring, and the restorably-yieldable reversible mechanical interlinkage includes restorably-yieldable coil spring structure located within the drive unit as well as locking means for preventing the unhindered restoration of the coil spring when the reels are removed from the drive unit.

21. The apparatus of claim 2 in which the transducer head is part of the drive unit and the intermediate portion of the reel assembly contains a separate record track support for conveniently holding the record track extending between the reels when the record track is removed from the transducer head for the separation of the reel assembly from the drive unit.

22. The apparatus of claim 1 in which the restorably-yieldable reversible energy transmitting differential drive includes coil spring structure for maintaining said record track tension and speed reducing means for decreasing the ratio of restorably-yieldable coil spring adjustment to differential reel motion.

23. In a magnetic record transducing apparatus for transducing magnetic signals on an elongated reelable magnetic record track by magnetic flux interlinkage between a magnetic record transducing head and successive elements of the track; two revolvable reels, each having spaced reel walls bordering a reel space arranged to store track coils of said record track; a reel driving structure including at least two reel driving elements, said reels being arranged for removable coupling in operative positions to said two drive elements respectively, for reeling said track past said head; a generally U-shaped resilient guard having two arms held between said side walls and resiliently engaging said track coil to prevent loosening of its track coil; a support for said reel driving structure having a restraining element for restraining said guard structure against rotation with its reel; said guard having an intermediate portion arranged to engage said restraining element when the associated reel is coupled in operative position to its drive element; said guard being released from engagement with said restraining element when its associated reel is removed from its coupling engagement with its drive element.

24. In a magnetic record transducing apparatus as claimed in claim 23, a restorably-yieldable reversible mechanical linkage between said two reels causing the rotation of one reel to drive the other reel at such differential speed correlated to the diameters of the reel coils as to reel the record track from one reel to the other and maintain the intermediate track portion under a limited tension during the reeling of substantially the entire length of said track.

25. In a magnetic record transducing apparatus as claimed in claim 24, said reversible mechanical interlinkage being connected to said reels through said reel driving elements.

26. In a magnetic record transducing apparatus as claimed in claim 25, an additional member operative to prevent dissipation of energy by said reversible mechanical interlinkage when said reels are removed from their coupling engagement to said drive elements.

JOHN P. ARNDT, Jr.
CARY B. JONES.
SEMI JOSEPH BEGUN.

REFERENCES CITED

The following references are of record in the file of this patent:

UNITED STATES PATENTS

| Number | Name | Date |
|---|---|---|
| 662,762 | Brownell | Nov. 27, 1900 |
| 1,718,355 | Hutchison | June 25, 1929 |
| 1,731,235 | Chipman | Oct. 15, 1929 |
| 1,809,266 | Castro | June 9, 1931 |
| 1,886,856 | Warwick | Nov. 8, 1932 |
| 2,003,968 | Hickman | June 4, 1935 |
| 2,080,812 | Fairbanks | May 18, 1937 |
| 2,213,631 | Heller | Sept. 3, 1940 |
| 2,277,305 | Clopton | Mar. 24, 1942 |
| 2,321,812 | Heller et al. | June 15, 1943 |
| 2,335,277 | Heller | Nov. 30, 1943 |
| 2,349,018 | Tasker | May 16, 1944 |
| 2,364,556 | Somers | Dec. 5, 1944 |
| 2,427,193 | Canfield | Sept. 9, 1947 |

FOREIGN PATENTS

| Number | Country | Date |
|---|---|---|
| 21,353 | Great Britain | Dec. 16, 1893 |
| 313,672 | Great Britain | June 20, 1929 |
| 375,749 | Germany | May 18, 1923 |

Certificate of Correction

Patent No. 2,535,478 December 26, 1950

JOHN P. ARNDT, Jr., ET AL.

It is hereby certified that error appears in the printed specification of the above numbered patent requiring correction as follows:

Column 36, line 26, strike out the words "intermediate portion of the" and insert the same after "holding the" in line 28;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*